(12) United States Patent
Erhart et al.

(10) Patent No.: US 10,059,446 B2
(45) Date of Patent: *Aug. 28, 2018

(54) GROUND VEHICLE-LIKE CONTROL FOR REMOTE CONTROL AIRCRAFT

(71) Applicant: TRAXXAS LP, McKinney, TX (US)

(72) Inventors: Wesley Ronald Erhart, McKinney, TX (US); Scott Rollin Michael Schmitz, Lewisville, TX (US); Thomas Michael Kawamura, Plano, TX (US); Richard Douglas Hohnholt, Coppell, TX (US); Kent Poteet, Lucas, TX (US)

(73) Assignee: Traxxas LP, McKinney, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,935

(22) Filed: Jun. 6, 2016

(65) Prior Publication Data

US 2017/0349277 A1  Dec. 7, 2017

(51) Int. Cl.
| G05D 1/00 | (2006.01) |
| G05D 3/00 | (2006.01) |
| G06F 7/00 | (2006.01) |
| G06F 17/00 | (2006.01) |
| B64C 39/02 | (2006.01) |
| G05D 1/04 | (2006.01) |
| G05D 1/08 | (2006.01) |

(52) U.S. Cl.
CPC ......... *B64C 39/024* (2013.01); *G05D 1/0016* (2013.01); *G05D 1/0022* (2013.01); *G05D 1/042* (2013.01); *G05D 1/0808* (2013.01); *B64C 2201/146* (2013.01)

(58) Field of Classification Search
None
See application file for complete search history.

(56) References Cited

U.S. PATENT DOCUMENTS

| 4,964,598 | A | 10/1990 | Berejik et al. |
| 5,238,203 | A | 8/1993 | Skonieczny et al. |
| 5,707,237 | A | 1/1998 | Takemoto et al. |
| 5,865,624 | A | 2/1999 | Hayashigawa |
| 5,984,240 | A * | 11/1999 | Shinagawa ............ G05D 1/085 |
| | | | 244/195 |
| 6,227,482 | B1 | 5/2001 | Yamamoto |
| 7,220,160 | B2 | 5/2007 | Kiuchi |
| 7,610,131 | B2 | 10/2009 | Kojima |

(Continued)

FOREIGN PATENT DOCUMENTS

| CN | 102671390 | 9/2012 |
| JP | H10-257575 A | 9/1998 |

(Continued)

OTHER PUBLICATIONS

3D Robotics, "PPM Encoder," PPM Encoder User Manual V2, 3D Robotics, Inc., Jan. 13, 2014, 3 pages.

(Continued)

*Primary Examiner* — Anne M Antonucci
*Assistant Examiner* — Kenny A. Taveras
(74) *Attorney, Agent, or Firm* — Darryl R. Wright; Greg Carr

(57) ABSTRACT

A hand-held radio transmit controller for remotely controlling an aircraft, and a method for controlling a remote control aircraft offering ground vehicle-like control.

11 Claims, 16 Drawing Sheets

(56) References Cited

U.S. PATENT DOCUMENTS

| | | |
|---|---|---|
| 7,885,732 B2 | 2/2011 | Troy |
| 7,931,239 B2 | 4/2011 | Pedersen et al. |
| 8,049,600 B2 | 11/2011 | Beard et al. |
| 8,154,227 B1 | 4/2012 | Young |
| 8,160,816 B2 | 4/2012 | Kanai |
| 8,200,375 B2 | 6/2012 | Stuckman et al. |
| 8,330,583 B2 | 12/2012 | Beard et al. |
| 8,473,117 B1 | 6/2013 | McConville |
| 8,545,284 B2 | 10/2013 | Baarman et al. |
| 8,818,571 B1 | 8/2014 | Iida et al. |
| 9,004,973 B2 | 4/2015 | Condon et al. |
| 9,020,644 B2 | 4/2015 | Greely et al. |
| 9,043,029 B2 | 5/2015 | Seo |
| 9,268,336 B2 * | 2/2016 | Erhart .................. A63H 30/04 |
| 9,304,305 B1 * | 4/2016 | Paul .................. G02B 15/163 |
| 9,360,868 B2 * | 6/2016 | Erhart .................. A63H 30/04 |
| 9,365,290 B1 * | 6/2016 | Morris .................. G05D 1/102 |
| 9,715,230 B2 | 7/2017 | Erhart et al. |
| 9,764,822 B2 * | 9/2017 | Morrison ................ B64C 13/18 |
| 2002/0022909 A1 | 2/2002 | Karem |
| 2002/0142701 A1 | 10/2002 | Rosenberg |
| 2004/0077284 A1 | 4/2004 | Bonilla et al. |
| 2005/0222729 A1 | 10/2005 | Sakata |
| 2006/0052917 A1 | 3/2006 | Schwarzhaupt et al. |
| 2006/0071551 A1 | 4/2006 | Taniguchi et al. |
| 2006/0085111 A1 | 4/2006 | Kojima |
| 2006/0164383 A1 | 7/2006 | Machin et al. |
| 2006/0229034 A1 * | 10/2006 | Gizis .................. A63H 30/04 455/95 |
| 2007/0018041 A1 | 1/2007 | Butler et al. |
| 2007/0035412 A1 | 2/2007 | Dvorak et al. |
| 2007/0221780 A1 | 9/2007 | Builta |
| 2008/0026671 A1 | 1/2008 | Smith et al. |
| 2009/0076664 A1 | 3/2009 | McCabe et al. |
| 2009/0099735 A1 | 4/2009 | McCoy et al. |
| 2009/0222168 A1 | 9/2009 | Egenfeldt |
| 2010/0250022 A1 * | 9/2010 | Hines .................. G05D 1/101 701/2 |
| 2011/0049290 A1 * | 3/2011 | Seydoux ................ A63H 27/12 244/17.13 |
| 2011/0054717 A1 | 3/2011 | Yamauchi |
| 2011/0231050 A1 | 9/2011 | Goulding |
| 2011/0275274 A1 | 11/2011 | Dewitt et al. |
| 2012/0015686 A1 * | 1/2012 | Krupnik .................. A63H 30/04 455/550.1 |
| 2012/0027049 A1 | 2/2012 | Beard et al. |
| 2012/0041658 A1 | 2/2012 | Turner |
| 2012/0046856 A1 | 2/2012 | Doi |
| 2012/0130593 A1 | 5/2012 | Davis |
| 2012/0179322 A1 | 7/2012 | Hennessy |
| 2012/0232718 A1 | 9/2012 | Rischmuller et al. |
| 2012/0232721 A1 * | 9/2012 | Engblom ................ B64C 37/02 701/3 |
| 2012/0259479 A1 | 10/2012 | Yoneta et al. |
| 2012/0298789 A1 * | 11/2012 | Oz .................. B64C 15/12 244/12.4 |
| 2013/0006448 A1 | 1/2013 | Callou et al. |
| 2013/0226408 A1 | 8/2013 | Fung et al. |
| 2013/0226409 A1 | 8/2013 | Akiyama et al. |
| 2013/0231814 A1 | 9/2013 | Sarokhan et al. |
| 2014/0018980 A1 * | 1/2014 | Bollapragada ....... G08G 5/0021 701/10 |
| 2014/0143839 A1 | 5/2014 | Ricci |
| 2014/0158819 A1 * | 6/2014 | Tixier .................. B64B 1/005 244/30 |
| 2014/0217229 A1 | 8/2014 | Chan |
| 2014/0277836 A1 | 9/2014 | Iida et al. |
| 2014/0323013 A1 | 10/2014 | Gonzalez-Heydrich et al. |
| 2015/0039350 A1 | 2/2015 | Martin et al. |
| 2015/0094880 A1 | 4/2015 | Beard et al. |
| 2015/0103019 A1 | 4/2015 | Young |
| 2015/0142211 A1 * | 5/2015 | Shehata ................ H04N 7/181 701/2 |
| 2015/0202540 A1 * | 7/2015 | Erhart .................. A63H 30/04 340/12.5 |
| 2015/0370256 A1 * | 12/2015 | Erhart .................. A63H 30/04 701/2 |
| 2016/0200421 A1 * | 7/2016 | Morrison ................ B64C 13/18 244/17.23 |
| 2016/0247115 A1 * | 8/2016 | Pons .................. G06Q 10/087 |
| 2017/0123413 A1 * | 5/2017 | Ye .................. G05D 1/0011 |
| 2017/0235303 A1 * | 8/2017 | Haruta ................ G05D 1/0016 701/2 |

FOREIGN PATENT DOCUMENTS

| | | |
|---|---|---|
| JP | 2000-126466 A | 5/2000 |
| JP | 2000-209684 A | 7/2000 |
| JP | 2001-352414 A | 12/2001 |
| JP | 2002-263368 A | 9/2002 |
| JP | 2003-38863 A | 2/2003 |
| JP | 2006-312344 A | 11/2006 |
| JP | 2007-79797 A | 3/2007 |
| JP | 2010-029724 A | 2/2010 |

OTHER PUBLICATIONS

ArduCopter Multirotor UAV, "APM:Copter," Table of Contents, 3D Robotics, www.copter.ardupilot.com, Oct. 28, 2014, 2 pages.

Oes, J,, "Manual for 8 Channel PPM Encoder (v2) Firmware: v2.3.16," 3DR, Mar. 1, 2013, 4 pages.

Firebird Stratos, "Instruction Manual," RTF Ready-To-Fly, Hobbyzone, HBZ7700, www.hobbyzonerc.com, Dec. 14, 2012, 24 pages.

Futaba,:Digital Proportional Radio Control "PCM Single Stick Pulse Code Modulation System," Instruction Manual FP-8SSAP, PCM 8 Channels for F3A Aircraft, 44 pages; Jan. 1, 2007.

Eagle Tree Systems LLC., "Guardian 2D/3D Stabilizer," Document Version 2.3, PC Software 10.63 or Later, 2013-2014, 14 pages.

Eagle Tree Systems LLC., "Instruction Manual for Guardian TM Stabilzation Expander," Document Version 1.9, Corresponds to Eagle Tree Software Versionn 10.01 or Higher, www.eagletreesystems.com, Jan. 2011, 7 pages.

PCT/US2014/062734; International Search Report and Written Opinion; dated Feb. 10, 2015.

U.S. Appl. No. 14/461,228; Declaration of Property Rights, dated Oct. 16, 2014.

Scott, Dave; "Building Good Habits for a Better Future" Aileron-Rudder Mixing Explained; Oct. 20, 2014. http://www.rcflightschool.com/aileron-ruddermixing.pdf.

Futaba; "Futaba 8J Manual"; Oct. 24, 2014.

Futaba FP-8SSAP Instruction Manual; Jan. 1, 2007 http://web.archive.org/web/20070101235151/http://manuals.hobbico.com/fut/8ssap-manual.pdf.

Eagle Tree Guardian 2D/3D Stabilizer instructions Doc. Ver. 1.7; Feb. 28, 2013.

Short, Jason; APM Copter Drift Mode; Nov. 11, 2013 http://www.youtube.com/watch?v=0mdk2-sNXmg.

APM Copter; ArduCopter; Drift Mode; Oct. 27, 2014 http://copter.ardupilot.com/wiki/drift-mode/.

Happy Cow; 3-channel Move Motion helicopter; Pistol Transmitter, photographs of Pistol Transmitter product; Apr. 16, 2012.

Hitec; Neon SS Manual; Jan. 26, 2011 http://web.archive.org/web/20110126193403/http://hitecrcd.com/files/NeonSSFMManual.pdf.

Happy Cow; Pistol Transmitter "Move Motion Manual"; Apr. 16, 2012.

Park, Sanghyuk.; "Autonomous Aerobatics on Commanded Path"; Aerospace Science and Technology, vol. 22, No. 1, pp. 64-74; Jun. 30, 2011.

PCT/US2014/051339; International Search Report and Written Opinion; dated May 28, 2015.

Unknown; Taiwan IPO Search Report; dated Oct. 28, 2013.

* cited by examiner

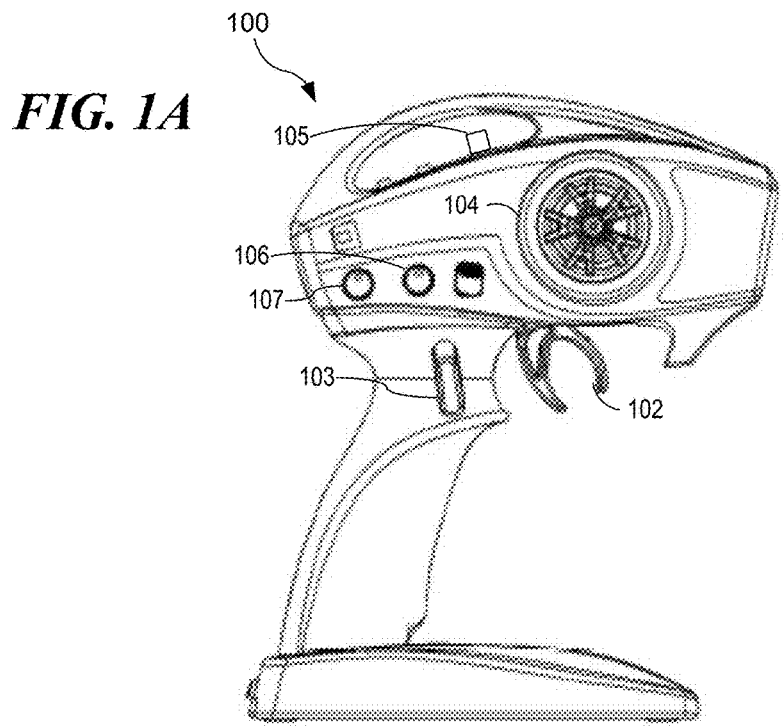
FIG. 1A
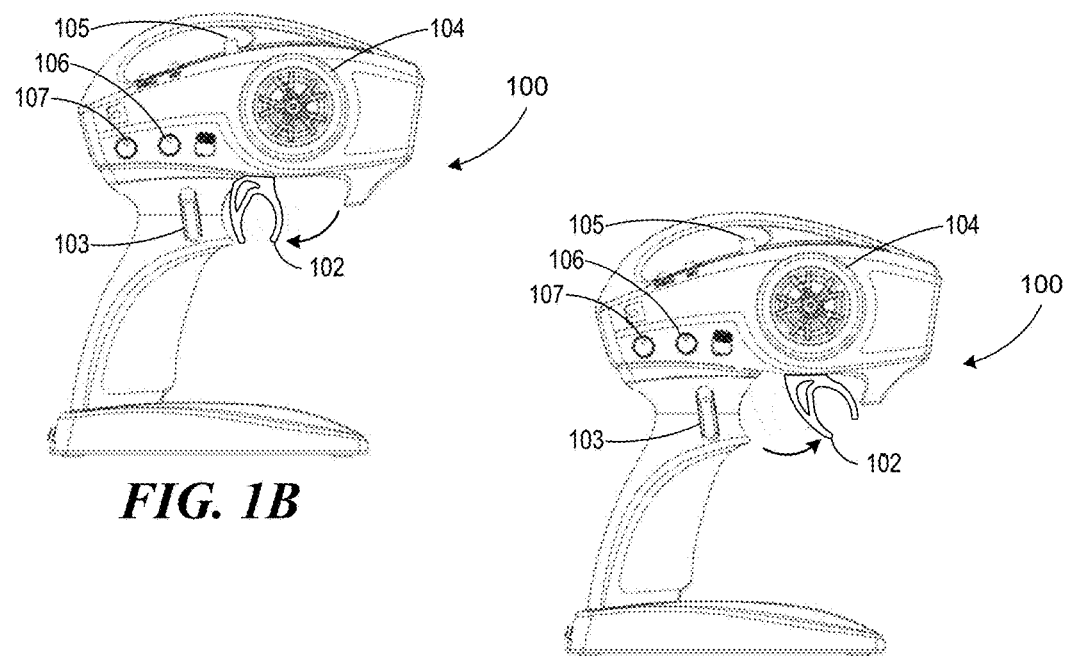
FIG. 1B
FIG. 1C

FIG. 15
*PRIOR ART*

Virtual Instructor™ Technology

The Virtual Instructor™ technology features 4 assisting systems:

Wing Leveling—Uses a stabilization sensor to keep the wings level during normal flight.
*What you will see...after the throttle is increased above 50%, the propellers will turn when rudder is applied or the aircraft is moved.*

Rudder to Elevator Mixing—Assists with stability during turns.
*What you will see...the elevator moves when the rudder is moved.*

Throttle to Elevator Mixing—Aids in control during descending and landing.
*What you will see...the elevator moves when the throttle stick is moved below 50%.*

Rudder to motor (differential thrust) mix—Supports wing leveling to make more powerful corrections.
*What you will see...after the throttle is increased above 50%, the propellers will turn when rudder is applied or the aircraft is moved.*

These automatic systems work together to help prevent the kind of situations experienced by new pilots, such as over-correction, that can lead to accidents.

*FIG. 18*
*Terrain - Topography*
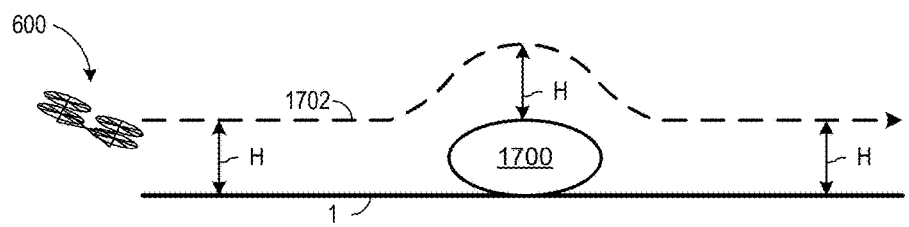
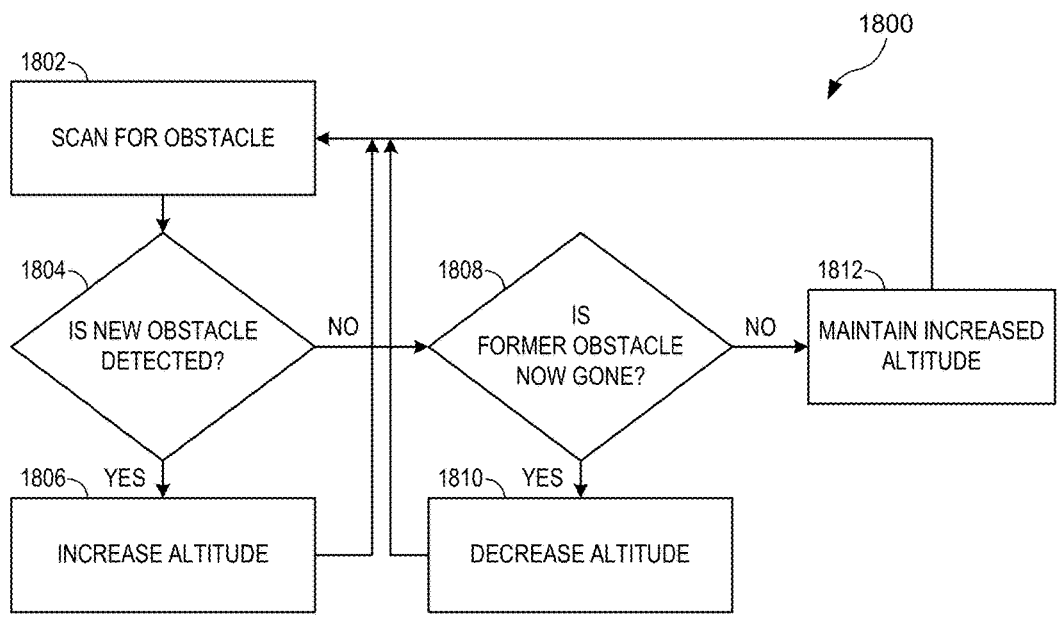
*FIG. 19*

*Virtual Jumps*

*Traction & Skidding*

*push*

*Oversteer & Understeer*

*Fixed Wheelbase*

*Dynamic Response*

Brake to a Stop
FORWARD FLIGHT

PITCH-BACK BRAKING

POSITION HOLD MODE

FIG. 32
*Hover Control – Transmit Controllers*
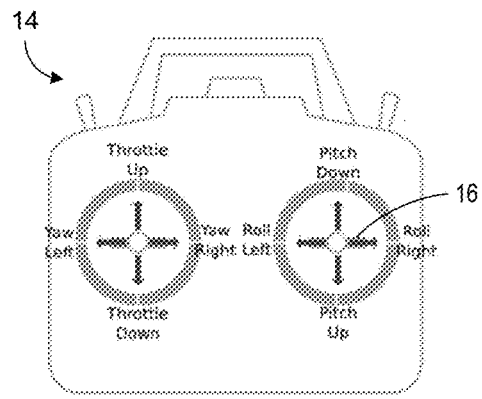
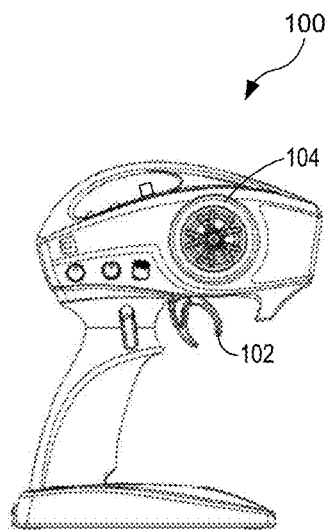
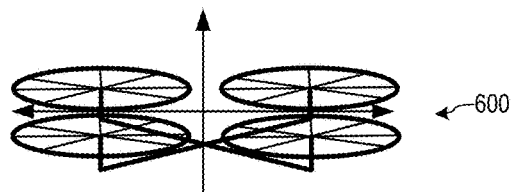
FIG. 33
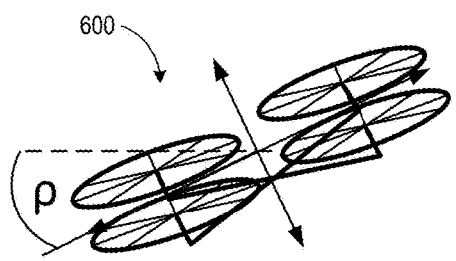
FIG. 34
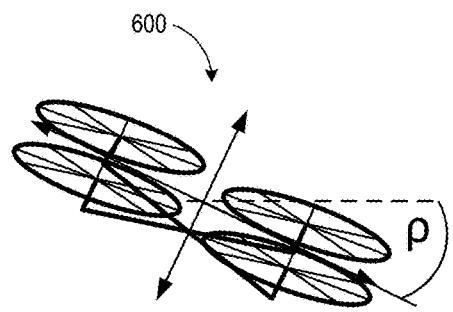
FIG. 35

GROUND VEHICLE-LIKE CONTROL FOR REMOTE CONTROL AIRCRAFT

CROSS-REFERENCE TO RELATED APPLICATIONS

This application is related to U.S. non-provisional patent application Ser. No. 14/526,385 entitled GROUND VEHICLE-LIKE CONTROL FOR REMOTE CONTROL AIRCRAFT, filed Oct. 28, 2014, which relates to, which claims the benefit of the filing date of, U.S. provisional patent application Ser. No. 61/896,552 entitled GROUND VEHICLE-LIKE CONTROL FOR REMOTE CONTROL AIRCRAFT, filed Oct. 28, 2013, the entire contents of which are incorporated herein by reference for all purposes.

TECHNICAL FIELD

This application relates to remote control aircraft and, more particularly, to piloting of remote control aircraft.

BACKGROUND

Remote control (RC) ground vehicles are typically controlled with a transmit controller which has two components: a steering knob, also called a steering wheel, and a throttle/brake control. A human driver familiar with this control interface is able to adeptly drive a ground vehicle regardless of the vehicle's orientation with respect to the driver. Thus, the driver may be capable of driving the vehicle whether it is facing toward the driver or away from the driver. The driver may also easily execute high speed turns with a RC ground vehicle.

The same driver, however, may encounter difficulty when piloting an RC air vehicle. Piloting a conventional RC air vehicle requires significantly more skill than driving a RC ground vehicle. The conventional two-stick aircraft controller requires a pilot to control the aircraft's throttle and yaw and pitch and roll independently. The pilot must be aware of the orientation of the aircraft when applying the controls, which requires significantly more awareness than being aware of the orientation of a ground vehicle. Making a "coordinated turn" with an RC aircraft requires the pilot to simultaneously input yaw, pitch, and roll commands in order to command the aircraft to turn in the air without "skidding" (sliding to the outside) or "slipping" (dropping towards the inside) in the turn. At the same time the pilot must also make adjustments to the throttle command to control or maintain the aircraft's altitude.

It would be desirable if a pilot of an RC air vehicle could take greater advantage of the pilot's familiarity with the controls of an RC ground vehicle.

Conventional RC aircraft are controlled with a "two stick" transmit controller as previously described. A typical Mode 2 transmitter will be configured as shown in FIG. 14. Moving the left stick fore and aft controls throttle; moving it left and right controls yaw. Moving the right stick fore and aft controls pitch; moving it left and right controls roll. In the example of a fixed-wing aircraft, moving the left stick fore and aft will increase or decrease the thrust from the power source (electric motor or combustion engine). Move the left stick left and right will move the rudder control surface to yaw the airplane to the left or right. Moving the right stick fore and aft will move the elevator control surface(s) to pitch the airplane up and down. Moving the right stick left and right will move the aileron control surfaces to roll the airplane to the left or right.

Conventional two-stick transmitters may be configured with a "mix" between one or more controls. For example, a transmitter could be configured so the rudder moves when the ailerons are commanded to move. In this example, when moving only the right stick left and right, a percentage of rudder movement can be commanded. This may result in a so-called coordinated turn in which the airplane will both bank and yaw at the same time. Coordinated turns in fixed-wing aircraft may be useful to counteract the effects of adverse yaw, for example. In the example of a multi-rotor aircraft such as a quadcopter, coordinating bank angle and yaw together may be extremely useful in executing natural looking turns without "skidding" or "slipping".

One conventional two-stick transmitter that can be configured with a "mix" is the Futaba 8J. Both linear and non-linear (5 point) mixes can be configured. Pages 65-69 of the product manual contain detailed description of the mixes available. The entirety of the Futaba 8J product manual is hereby incorporated by reference. The four linear programmable mixes available on the Futaba 8J are setup by default as: 1) aileron to rudder for coordinated turns, 2) elevator to flap for tighter loops, 3) flap to elevator to compensate pitching with flaps and 4) throttle to rudder for ground handling compensation.

Pre-configured mixes may be available on some ready-to-fly (RTF) aircraft which use simple transmitters that are not programmable by the end user. One example is the Hobbyzone Firebird Stratos, by Horizon Hobby. Using its Virtual Instructor Technology, as shown in FIG. 15, this aircraft uses at least three different mixes: 1) rudder to elevator mixing, 2) throttle to elevator mixing and 3) rudder to motor mixing. See page 6 of the Firebird Stratos Instruction Manual for more details. The entirety of the Firebird Stratos Instruction Manual is hereby incorporated by reference.

Non-conventional "single stick" transmitters were popular for some time in 1970's and the 1980's. These transmitters relocated control of the rudder to the right stick, by using a knob at the tip of the stick, as seen in FIG. 16. Rotating the knob to the right (clockwise) would result in the same control as pushing the conventional rudder stick of FIG. 14 to the right. Rotating the knob to the left (counter-clockwise) would result in the same control as pushing the conventional rudder stick of FIG. 14 to the left. The throttle was controlled by a slider, typically actuated by the pilot's left thumb. The Futaba FP-T8SSA-P transmitter is one example of a "single stick" transmitter. Mixing was available on this Futaba single-stick radio, the details of which can be found at least on pages 5, 29, 30, 32, 33 and 34 of the Futaba FP-T8SSA-P Instruction Manual. A quote from page 33, titled AILERON→RUDDER MIXING, "This function is sometimes referred to as 'CAR' (Coupled Ailerons and Rudder) and is useful on sailplanes and certain scale models where aileron and rudder must be used together for coordinated turns." The entirety of the Futaba FP-T8SSA-P Instruction Manual is hereby incorporated by reference.

The entirety of each of the following U.S. Patents is hereby incorporated by reference: U.S. Pat. No. 8,473,117 to McConville; U.S. Pat. No. 6,227,482 to Yamamoto; and U.S. Pat. No. 8,200,375 to Stuckman et al. The subject matter disclosed in each of the aforementioned patents may be utilized or adapted to control single-rotor, multiple-rotor and/or fixed-wing aircraft as discussed herein.

Aftermarket aircraft control systems are available that utilize more advanced electronics and control systems to improve control of the aircraft and sometimes to automate certain functions. One example is the Guardian by Eagle Tree Systems. The Guardian is specifically made for fixed-wing aircraft and uses both accelerometers and gyroscopes. In its 2D Mode it provides wing leveling stabilization, returning the model to level flight when needed. In 3D mode it works to smooth out turbulence and stall characteristics. The Guardian also includes Automatic Turn Coordination which employs the "step on the ball" method to actuate the rudder in order to coordinate turns. As the aircraft enters a banked turn the Guardian will actuate the rudder and "step on the ball" to perform automatic turn coordination. There are many other features available on the Guardian as shown in the product literature and Guardian Instruction Manual. The Guardian 2D/3D Stabilizer Manual and the Instruction Manual for Guardian Stabilization Expander by Eagle Tree Systems are hereby incorporated by reference.

APM, a popular open-source autopilot suite, released version 3.1 of their APM:Copter in December of 2013. In this version they included a new flight mode called "Drift Mode", which allows the pilot to fly a multirotor helicopter as if it were a plane with built in automatic coordinated turns. The pilot has direct control of yaw and pitch, but roll is controlled by the autopilot. The right stick controls pitch and yaw and the left stick is for manual altitude control via the throttle. When the aircraft is moving forward and the pilot pushes the right stick to the left or right to make a turn, the aircraft will also bank at the same time, to make a coordinated turn in that direction. Drift mode relies on GPS to function. Yaw and roll are mixed based on velocity. More information can be obtained by visiting the APM website, http://copter.ardupilot.com/. The APM:Copter documentation available in the ArduCopter Multirotor UAV web pages at http://copter.ardupilot.com/, including but not limited to the "Manual for 8 Channel PPM Encoder (v2), Firmware: v2.3.16" and "PPM Encoder" instruction manual by 3DRobotics, are hereby incorporated by reference.

SUMMARY

A hand-held radio transmit controller for remotely controlling an aircraft may be used in conjunction with a method for controlling a remote control aircraft offering ground vehicle-like control.

DESCRIPTION OF DRAWINGS

Reference is now made to the following Detailed Description taken in conjunction with the accompanying drawings, in which:

FIGS. 1A-1C shows a traditional RC ground controller;

FIG. 15 illustrates an example of pre-configured mixes which may be available on some ready-to-fly (RTF) aircraft which use simple transmitters;

FIG. 18 is a pictorial diagram illustrating an aircraft avoiding an obstacle;

FIG. 19 is flow chart illustrating a method for an aircraft avoiding an obstacle;

FIG. 32 is a pictorial diagram illustrating two RC transmit controllers;

FIG. 33 is a pictorial diagram illustrating an aircraft in a level bank attitude.

FIG. 34 is a pictorial diagram illustrating an aircraft in a bank attitude banked to the right; and FIG. 35 is a pictorial diagram illustrating an aircraft in a bank attitude banked to the left.

DETAILED DESCRIPTION

Figure 2:
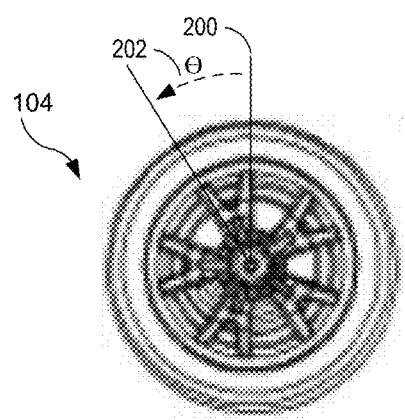
FIG. 2 shows the operation of the steering knob of a traditional RC ground controller.

In the following discussion, numerous specific details are set forth to provide a thorough explanation. However, such specific details are not essential. In other instances, well-known elements have been illustrated in schematic or block diagram form. Additionally, for the most part, specific details within the understanding of persons of ordinary skill in the relevant art have been omitted.

Referring to FIGS. 1A-1C, depicted is a typical ground R/C vehicle transmit controller 100. Transmit controller 100 has a human machine interface (HMI) comprising such features as throttle trigger 102, steering knob 104, and other controls or indicators as required. In an embodiment, the "trigger" may be a lever having a shape, such as the trigger shape shown herein, the lever mounted for pivotable movement in at least two directions. The lever, trigger 102, may have a neutral position in the approximate center of its range of travel, and may provide a continuous range of input into the control system when moved. In an embodiment, when the lever is moved in a first direction towards the user, a forward direction of vehicle travel may be indicated by the command input, and when the lever is moved in a second direction away from the user, braking or a reverse direction of ground vehicle travel may be indicated by the command input. The lever in intermediate positions between the neutral position and the two extremes of travel may provide a continuous range of input which, in an embodiment, may be interpreted as desired vehicle speed in the chosen direction, or the amount of braking to be applied.

In an embodiment, the transmit controller 100 may also have a "thumb switch" 103, a "channel four" switch 105, and two auxiliary adjustment knobs 106 and 107. When the vehicle is not being driven, throttle trigger 102 may be at a neutral position, as shown in FIG. 1A. A driver may pull throttle trigger 102 from the neutral position toward the driver to command forward throttle, as shown in FIG. 1B. The driver may push throttle trigger 102 from the neutral position away from the driver to command reverse throttle or braking, as shown in FIG. 1C. The distance the driver pushes or pulls throttle trigger 102 from the neutral position may determine the amount of throttle or braking applied.

Figure 3:
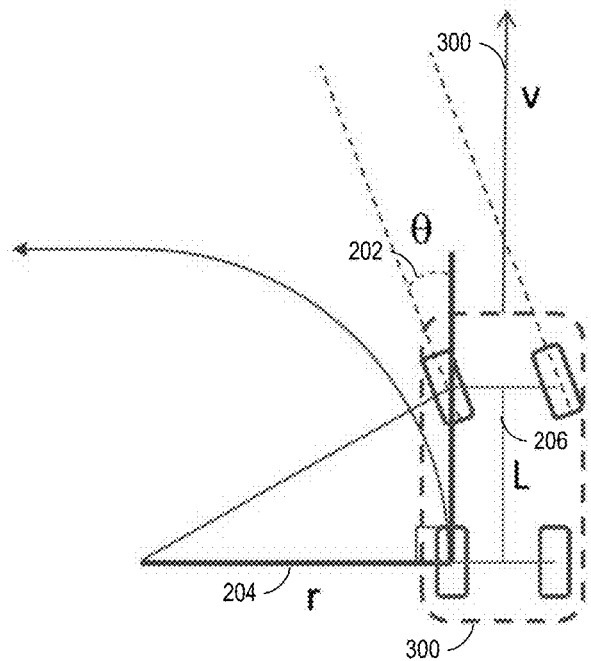
FIG. 3 shows the relationship between steering angle and turn radius.

Referring to FIG. 2, depicted is the operation of steering knob 104. The driver may turn steering knob 104 from neutral position 200 to command the vehicle to use steering angle 202. Referring to FIG. 3, depicted is the effect of steering angle 202 on the vehicle 300, which is moving with velocity 300. As is known in automobile physics, steering angle 202 affects vehicle turn radius 204. Vehicle wheelbase 206 also affects vehicle turn radius 204. Larger steering angles result in smaller vehicle turn radii.

Figure 4:
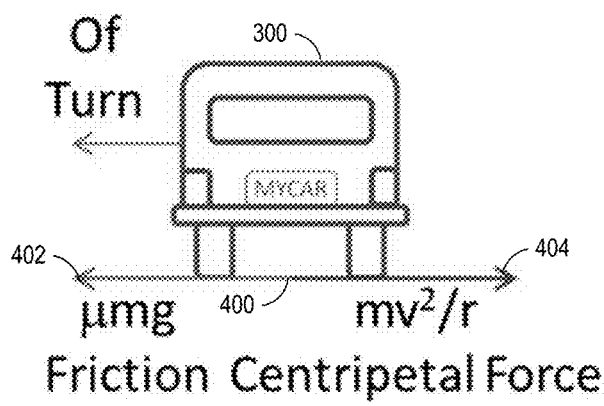
FIG. 4 shows forces acting on a ground vehicle during a turn.

Referring to FIG. 4, depicted is a rear view of ground vehicle 300 during a turn on surface 400. During the turn, friction 402 between vehicle 300 and surface 400 prevent vehicle 300 from skidding. If vehicle 300 is turned at too small a turn radius for its speed, centripetal force 404 exceeds friction 402 and causes vehicle 300 to skid sideways in the turn.

An air vehicle may be piloted with a control model similar to the control model of a ground vehicle. This ground vehicle-like control model may be applied to all varieties of air-based vehicles: quadrotor, coaxial, fixed-wing, other helicopters, etc. The pilot's transmit controller may have a throttle trigger and steering knob, which function similarly to conventional ground vehicle transmit controllers.

With the throttle trigger and steering knob, the pilot may control the air vehicle in two dimensions as the pilot would a ground vehicle. With the throttle trigger, the pilot may have control over forward and reverse movement. Forward movement by forward pitch of a rotary-winged aircraft and/or by increased throttle of a fixed-wing aircraft. Reverse movement by rearward pitch of a rotary-winged aircraft and/or decreased throttle in a fixed-winged aircraft. With the steering knob, the pilot may have control over steering. In one embodiment of the transmit controller, the throttle trigger may be controlled by the pilot's index finger or middle finger. In this same embodiment the steering knob may be gripped by the opposite hand, using two or more fingers.

Figure 8:
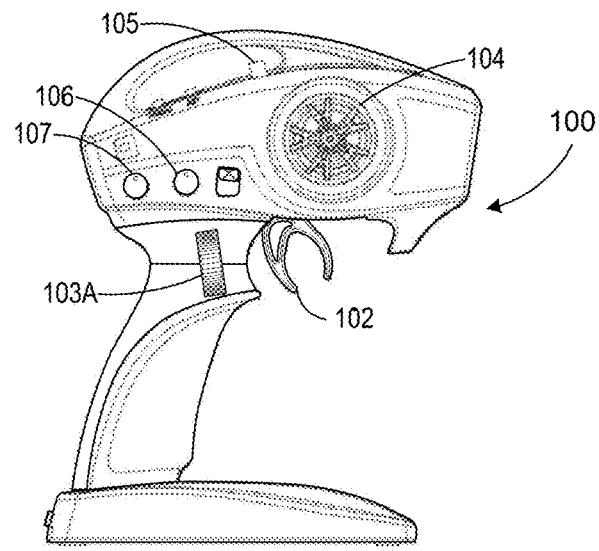
FIGS. 8-10, 11-12, and 13 show alternate RC ground controllers.
Figure 9:
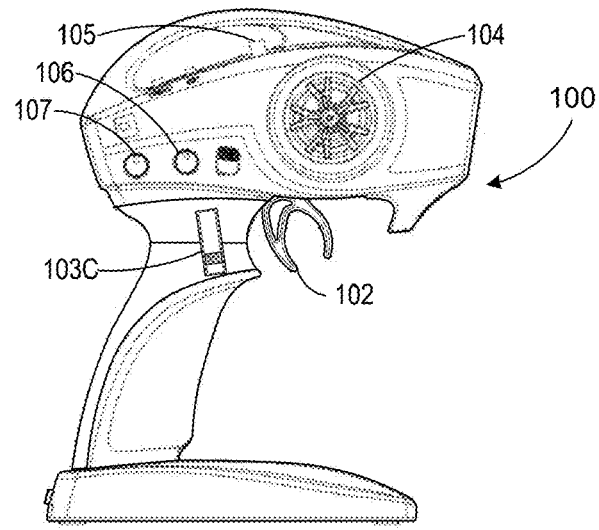
Figure 10:
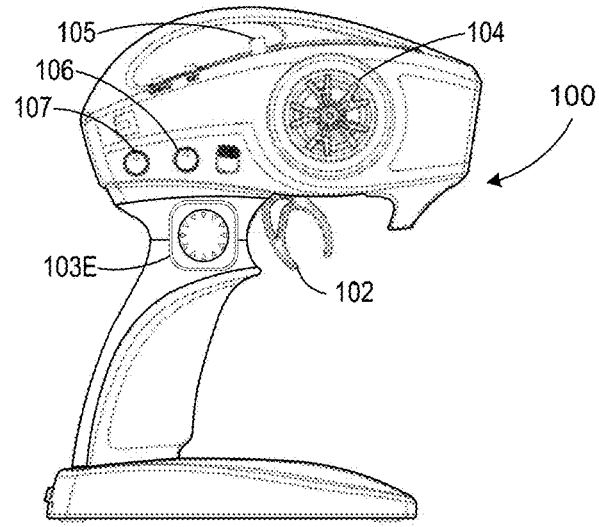
Figure 11:
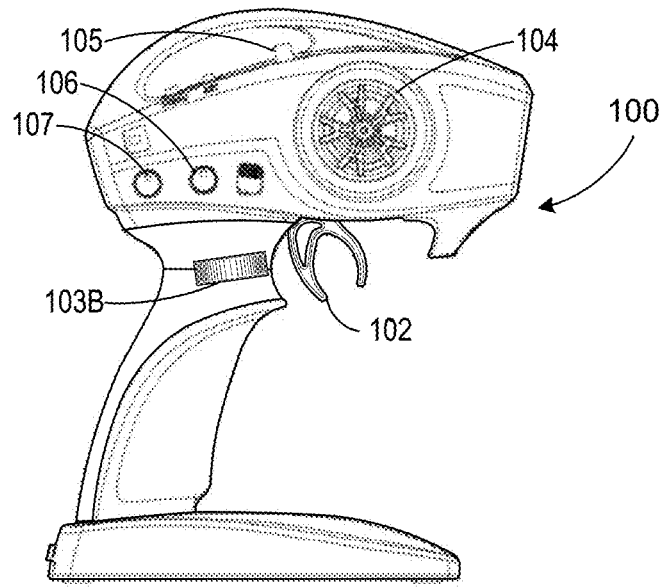
Figure 12:
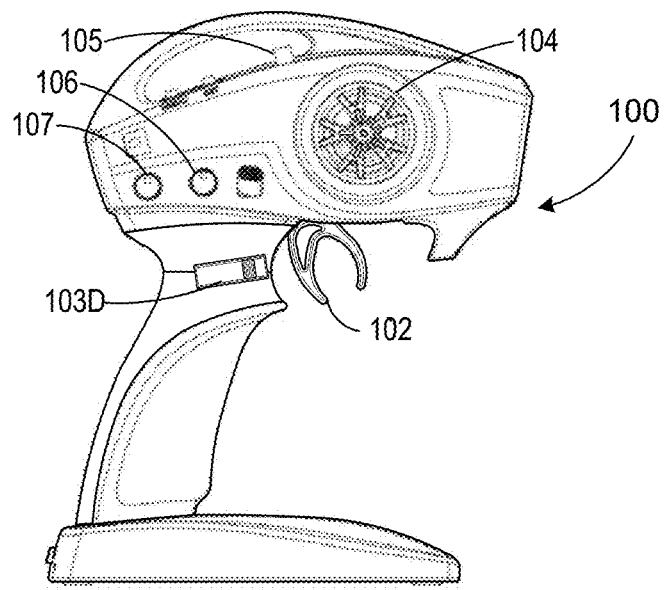

For control in three dimensions, the pilot's transmit controller may feature an altitude control in addition to the throttle trigger and steering knob. Different options are possible for the altitude control. A drive altitude knob may allow the pilot to specify a desired "drive altitude" for the air vehicle to maintain. An altitude gimbal, slider or thumb-wheel may allow the pilot to specify a rate of climb or dive. Referring to FIG. 1A, one embodiment of the pilot's aircraft transmit controller may have said drive altitude knob, gimbal, slider or thumb wheel located at 103, as shown in FIGS. 8-13, and operable by the pilot's thumb. As shown in FIG. 8, a thumbwheel 103A may be oriented to be turned up and down by the pilot's thumb. Alternatively, as shown in FIG. 11, a thumbwheel 103B may be oriented to be turned forward and backward by the pilot's thumb. As shown in FIG. 9, a slider 103B may be oriented to be slid up and down by the pilot's thumb. Alternatively, as shown in FIG. 12, a slider 103D may be oriented to be slid forward and backward by the pilot's thumb. As shown in FIG. 10, a gimbal 103E may be oriented to be moved up, down, forward and backward by the pilot's thumb.

Other locations for the altitude control may be used as well. For example, knob 106 or 107 may be used as the altitude control input. Other digits of the pilot's hand may be used to control the gimbal, slider or thumb-wheel, such as the index finger, middle finger, ring finger or pinky (baby) finger. For more natural altitude control, the transmit controller may have altitude tilt sensors. The tilt sensors may allow the pilot to indicate, or command, a climb or dive by tilting the transmit controller. The tilt sensors may determine the amount of tilt and the corresponding climb or dive rates. Regardless of the type of the altitude control, the transmit controller may transmit the drive altitude or desired climb or dive rates to the air vehicle.

Figure 13:
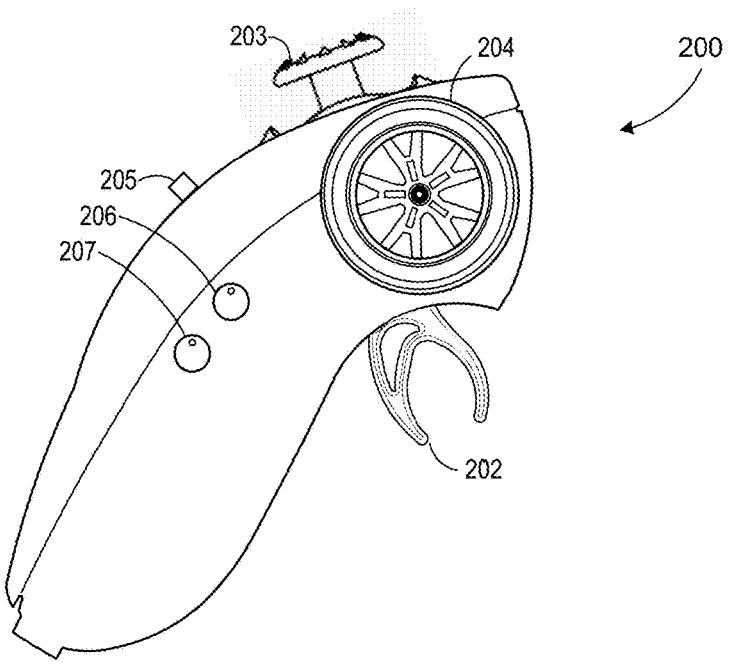
Figure 14:
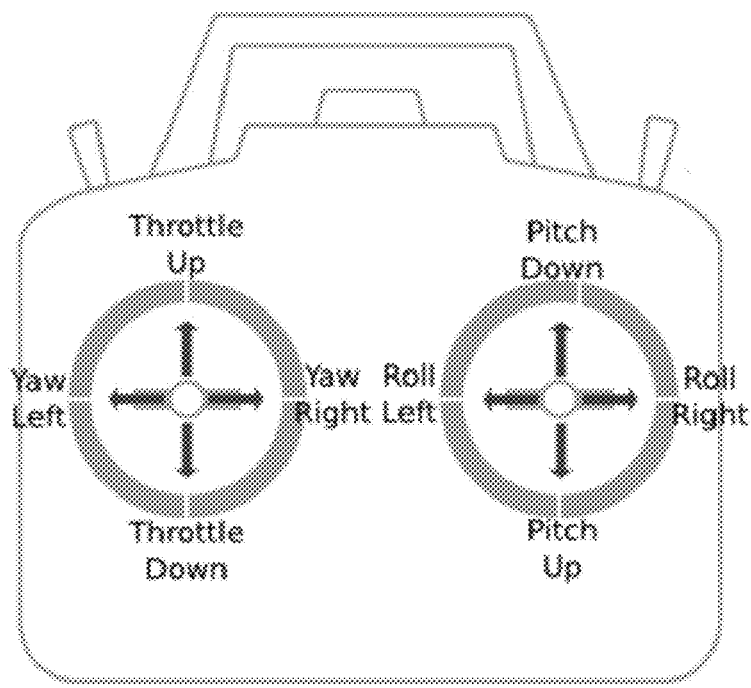
FIG. 14 illustrates a conventional, "two stick" transmit controller for RC aircraft.
Figure 16:
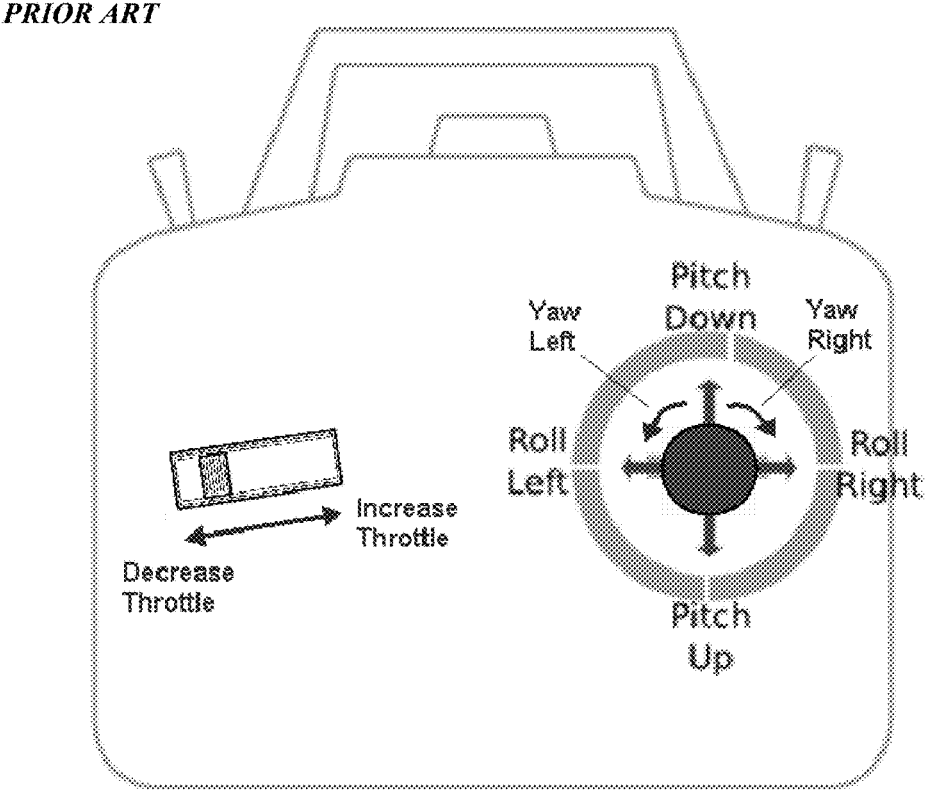
FIG. 16 illustrates a "single stick" transmitter popular in prior decades.

An alternate transmit controller 200 is shown in FIG. 13. Transmit controller 200 has throttle trigger 202 and steering knob 204, which may operate the same way as throttle trigger 102 and steering knob 104 in transmit controller 100. In an embodiment, the transmit controller 200 may also have a gimbal 203E, a "channel four" switch 205, a first auxiliary adjustment knob 106 and a second auxiliary adjustment knob 207, which may operate the same way as gimbal 103E, a "channel four" switch 105, and auxiliary adjustment knobs 106 and 107 in transmit controller 100. Operation of throttle trigger 202 may be the same as operation of throttle trigger 102 in transmit controller 100. When the vehicle is not being driven, throttle trigger 202 may be at a neutral position, as shown in FIG. 13. A driver may pull throttle trigger 202 from the neutral position toward the driver to command forward throttle. The driver may push throttle trigger 202 from the neutral position away from the driver to command reverse throttle or braking.

For an air vehicle to use a ground vehicle-like control model, two processes may be executed: an altitude control process and a steering control process. These processes may be added to a flight control process executed by a flight computer microprocessor on the aircraft. This flight control process may be performed by flight control software.

Figure 5:
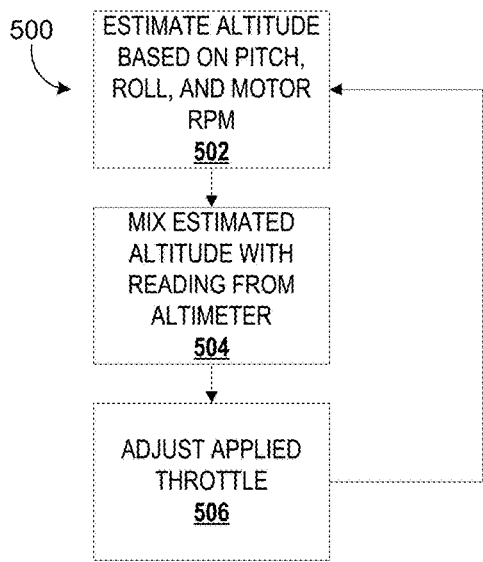
FIG. 5 shows an exemplary altitude control process.

Referring to FIG. 5, depicted is an exemplary altitude control process 500. The purpose of altitude control process 500 is to control the altitude of the aircraft relative to a user-specified drive altitude. The drive altitude may be adjusted on the transmit controller with a gimbal, slider or thumb-wheel as described above. Once the drive altitude has been set, altitude control process 500 may maintain the drive altitude or dive and climb relative to the drive altitude. As described above, the rate of a dive or climb may be specified by the tilt of the transmit controller. Altitude control process 500 may limit the aircraft's altitude between the altitude floor and the altitude ceiling specified on the transmit controller. In one embodiment of a transmit controller, the altitude floor or altitude ceiling may be specified, or commanded, by user interface inputs 105, 106 or 107 as shown in FIG. 1A.

Altitude control process 500 may be a feedback control process. At 502, altitude control process may estimate a current aircraft altitude based on the aircraft's pitch and roll angles and motor RPM. At 504, altitude control process 500 may mix this estimated aircraft altitude with a reading from an aircraft altimeter. Said mixing can be performed using various "sensor fusion" techniques well understood by those skilled in the art. Examples of aircraft altimeters may include precision, high-resolution MEMS barometric pressure sensors, ultrasonic, laser, radar, or GPS. At 506, the resulting estimated altitude may be used to adjust the applied throttle to all motors. Altitude control process 500 may maintain the aircraft's altitude as the aircraft changes its pitch angle to accelerate forward.

Figure 6:
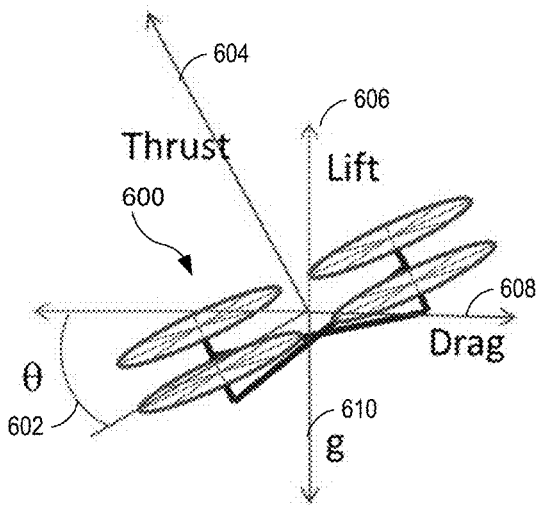
FIG. 6 shows forces which may be taken into consideration when maintaining the altitude of an air vehicle executing a coordinated banked turn.

Altitude control process 500 may also maintain the aircraft's altitude as the aircraft changes its pitch and roll angles to execute coordinated banked turns. Referring to FIG. 6, depicted is a quadcopter 600 executing a banked turn at angle 602. Forces which the altitude control process may take into consideration in maintaining the altitude of quadcopter 600 during the turn include thrust 604, lift 606, drag 608, and gravity 610. For example, when the aircraft banks by changing its roll angle from zero (horizontal) to angle 602, the vertical lift component 606 may decrease and the aircraft may lose altitude. In order to maintain the aircraft's altitude, the altitude control process 500 may command the motors to increase their RPM.

Figure 7:
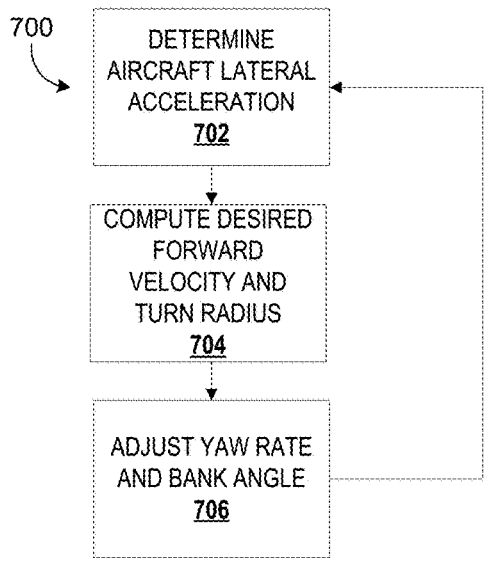
FIG. 7 shows an exemplary steering control process.

Referring to FIG. 7, depicted is an exemplary steering control process 700. The purpose of steering control process 700 is to convert the steering angle commanded by the transmit controller steering knob into an air vehicle maneuver. Steering control process 700 may be a control loop which uses an estimate of the vehicle's speed and the commanded steering angle to calculate the aircraft pitch, yaw, and roll angular rates and angles.

Using the pilot's input from the steering knob, steering control process 700 may adjust the roll and yaw of the air vehicle to match the dynamics of a ground vehicle. For example, a user may indicate a steering angle by turning the steering knob. Steering control process 700 may estimate the air vehicle's current forward velocity and use the steering angle and forward velocity to set the air vehicle's roll angle and yaw rate. Estimates of the multi-rotor air vehicle's (quadcopter, for example) current forward velocity may be obtained using the vehicle's pitch. In one method, the velocity estimate of steering control process 700 may be linear and directly proportional to the pitch angle of the air vehicle. In another method, steering control process 700 may take into account time when estimating the velocity. For example, the time to accelerate the vehicle from a starting velocity, V1, to a greater velocity, V2, will be non-zero. Understanding this non-zero time and accounting for it in steering control process 700 will provide a more accurate and realistic estimate of the vehicle's velocity. Alternatively the forward velocity estimate may be obtained by direct measurement using sensing technologies such as GPS, for example.

At 702, steering control process 700 may determine the lateral acceleration of the aircraft using the attitude (pitch, roll, and yaw) of the aircraft and a dynamic model of the aircraft. For example, if the aircraft is a quadcopter held at a fixed altitude, the thrust up counteracts the weight of the aircraft. Steering control process 700 may use this thrust and the aircraft's pitch and roll angles to estimate the aircraft's lateral acceleration. For a quadcopter which is diving or climbing, steering control process 700 may adjust its estimate of the thrust vector in consideration of the climb or dive rate.

At 704, steering control process 700 may apply the user's steering and throttle inputs and the model of the car to compute the user's desired forward velocity and turn radius.

At 706, steering control process 700 may use the target turn radius and the aircraft's speed and attitude to adjust the aircraft's yaw rate and bank angle.

For different aircraft types, one skilled in the art may bring known control methods to bear with both the altitude and steering control processes as appropriate. For example, with a fixed-wing aircraft, the steering control process might control the bank angle with a Proportional-Integral-Derivative (PID) Controller that maintains the "down vector" pointing through the bottom of the aircraft. For other aircraft types, such as quadcopters, the resulting centrifugal force might be estimated at 704 and used to determine the bank angle that maintains the "down vector" pointing through the bottom of the aircraft.

As another example, a quadcopter or other multi-rotor helicopter may have a mixing step in the flight control process. The altitude control process may determine an average power for all of the motors. The steering control process may determine the average power of the motors in relation to one another. A mixing step may linearly mix the results of these two processes to produce the average power for each motor.

For example, if the quadcopter were banking right, the steering control process may specify the left motors should have higher average power than the right motors. The mixing step may combine this result with the average power determined by the altitude control process to determine the average power each motor should operate at.

While the air vehicle control model described is comparable to the control model of a ground vehicle, it is not necessarily identical. For example, releasing controls on a land-based vehicle may cause the vehicle to roll to a stop and wait for the next user control input. For air-based vehicles, wind and other air currents may constantly prevent the vehicle from maintaining a single position.

In one embodiment, a steering control process may be used without an altitude control process. Altitude may be controlled conventionally, such as through throttle and collective pitch for quadcopters and helicopters, or through pitch and throttle for airplanes. The steering control process may control the yaw rate and roll angle for turns as described above.

In an aircraft: the controller in the aircraft may adjust throttle and/or pitch to keep the aircraft at a substantially constant altitude when an altitude change command signal is not received from the hand-held transmit controller. A third switch (e.g., a slide) on the hand-held transmit controller may be used to adjust altitude separately from the trigger. Further, the aircraft controller may add throttle in some relationship to pitch angle command, regardless of the altitude switch setting. Using mixing or some additive algorithm, the throttle may be increased or decreased from the setting determined by the trigger pitch control, using the third switch may be used to separately control altitude.

In certain embodiments, at least one of the HMI inputs may be used to vary two or more control outputs. An example is commanding turning of an aircraft with a single HMI input (e.g., stick movement, steering wheel turn, and the like), and corresponding bank, rudder (fixed-wing aircraft) and/or yaw rate (rotor aircraft) output commands being transmitted. Another example is commanding pitching of an aircraft with a single HMI input, and corresponding elevator (fixed-wing aircraft), pitch (rotor aircraft), and/or throttle output commands being transmitted.

In an aircraft, note that varying the position of the knob of the first HMI input may vary one or more radio signals transmitted by the radio transmitter for control of bank angle of an aircraft in a turn: (1) the yaw rate may be set with reference to the bank angle determined in response to control signals received by the aircraft receiver/controller (e.g., fixed linear ratio, fixed exponential ratio, or fixed to specific bank angles, etc.); (2) the yaw rate may be set with reference to the turn radius (tighter or more open turns) determined in response to turn control signals received by the aircraft receiver/controller; (3) the yaw rate may be set with reference to the turn radius determined in response to control signals received by the aircraft receiver/controller and with reference to the speed of the aircraft (either determined using accelerometers, estimated by pitch angle signals, etc.; (4) any other prior art techniques that are available or known, such as possibly adjusting yaw until accelerometer readings show the resulting force vector no longer having a lateral component, may be used.

In an aircraft: the radius of a turn may be controlled by setting bank angle for any given/constant (i) speed, (ii) pitch and/or (iii) throttle setting, or using any other available/known prior art technique.

In an embodiment, a method for controlling a remote control aircraft offering ground vehicle-like control, may comprise: receiving steering angle control input from a transmitter controller; a state estimation process estimating the attitude, acceleration, and velocity of the aircraft; a steering control process including: a model of a car including wheel base; and a mapping of the car model, the velocity and the steering angle to a desired yaw rate and bank angle; and the method further comprising a flight control process that controls the aircraft to the yaw rate and bank angle commanded by the steering control process. In an embodiment, the method may further comprise providing a throttle input to control forward/reverse velocity or braking. In an embodiment, the method may further comprise providing an altitude control.

It will be understood that a variety of control "mixes" are available on "computer" radios to avoid or compensate for other "undesirable" flight characteristics. An example is a mix of bank angle and pitch (or throttle). If the aircraft loses altitude due to loss in vertical lift when banking, the transmitter may be programmed to add up pitch or some throttle to help maintain altitude. Other control mixes, such as but not limited to previously discussed techniques implementing control mixing and various combinations of controls that are mixed, may be employed in transmit controller 100.

It is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of various embodiments.

Various methods, aircraft, and controllers consistent with the preceding disclosure comprise the following:

Method 1: A method for a remote control aircraft offering ground vehicle-like control, the method comprising:
  performing an altitude control process, the altitude control process comprising:
    estimating an altitude of the aircraft;
    receiving an altitude instruction from a transmit controller; and
    determining an altitude aircraft action to respond to the altitude instruction;
  performing a steering control process, the steering control process comprising:
    receiving a steering instruction specified by a pilot, the steering instruction comprising a steering angle; and
    determining a steering aircraft action to respond to the steering angle; and
  operating the aircraft in accordance with the altitude aircraft action and the steering aircraft action.

Method 2: Method 1, wherein estimating the altitude of the aircraft comprises:
  estimating a preliminary altitude based on at least a pitch angle of the aircraft, a roll angle of the aircraft, and an aircraft motor RPM; and
  mixing the preliminary altitude with a reading from an altimeter of the aircraft.

Method 3: Method 1, wherein the altitude instruction comprises one of an instruction to maintain altitude, an instruction to climb at a specified rate, and an instruction to dive at a specified rate.

Method 4: Method 1, wherein the steering aircraft action comprises setting a roll rate and setting a yaw rate.

Method 5: Method 1, wherein the aircraft is a fixed-wing aircraft.

Method 6: Method 1, wherein the aircraft is a helicopter.

Method 7: Method 1, wherein the aircraft is a multi-rotor helicopter comprising four rotors and four motors, with each rotor controlled by a motor.

Method 8: Method 7, wherein the altitude aircraft action comprises an average power applied to all of the motors and the steering aircraft action comprises an average power applied to each motor relative to the other motors.

Method 9: Method 8, further comprising linearly mixing the altitude aircraft action and the steering aircraft action to produce an average power applied to each motor.

Method 10: Method 9, wherein the operating the aircraft comprises applying to each motor the average power produced by the linear mixing.

Method 11: A method for a remote control aircraft offering ground vehicle-like control, the method comprising:
  performing a steering control process, the steering control process comprising:
    receiving a steering instruction specified by a pilot, the steering instruction comprising a steering angle; and
    determining a steering aircraft action to respond to the steering angle; and
  operating the aircraft in accordance with the steering aircraft action.

Method 12: Method 11, wherein the steering aircraft action comprises setting a roll rate and setting a yaw rate.

Method 13: Method 11, wherein the aircraft is a fixed-wing aircraft.

Method 14: Method 11, wherein the aircraft is a helicopter.

Method 15: Method 11, wherein the aircraft is a multi-rotor helicopter comprising four rotors and four motors, with each rotor controlled by a motor.

Aircraft 1: A remote control aircraft offering ground vehicle-like control, the aircraft comprising a flight control microprocessor configured to:
  perform an altitude control process, the altitude control process comprising:
    estimating an altitude of the aircraft;
    receiving an altitude instruction from a transmit controller; and
    determining an altitude aircraft action to respond to the altitude instruction;
  perform a steering control process, the steering control process comprising:

receiving a steering instruction specified by a pilot, the steering instruction comprising a steering angle; and
determining a steering aircraft action to respond to the steering angle; and
operate the aircraft in accordance with the altitude aircraft action and the steering aircraft action.

Aircraft 2: Aircraft 1, wherein the estimating the altitude of the aircraft comprises:
estimating a preliminary altitude based on at least a pitch angle of the aircraft, a roll angle of the aircraft, and an aircraft motor RPM; and
mixing the preliminary altitude with a reading from an altimeter of the aircraft.

Aircraft 3: Aircraft 1, wherein the altitude instruction comprises one of an instruction to maintain altitude, an instruction to climb at a specified rate, and an instruction to dive at a specified rate.

Aircraft 4: Aircraft 1, wherein the steering aircraft action comprises setting a roll rate and setting a yaw rate.

Aircraft 5: Aircraft 1, wherein the aircraft is a fixed-wing aircraft.

Aircraft 6: Aircraft 1, wherein the aircraft is a helicopter.

Aircraft 7: Aircraft 1, wherein the aircraft is a multi-rotor helicopter comprising four rotors and four motors, with each rotor controlled by a motor.

Aircraft 8: Aircraft 7, wherein the altitude aircraft action comprises an average power applied to all of the motors and the steering aircraft action comprises an average power applied to each motor relative to the other motors.

Aircraft 9: Aircraft 8, wherein the flight control microprocessor is further configured to linearly mix the altitude aircraft action and the steering aircraft action to produce an average power to be applied to each motor.

Aircraft 10: Aircraft 9, wherein the flight control microprocessor being configured to operate the aircraft comprises the flight control microprocessor being configured to apply to each motor the average power produced by the linear mixing.

Aircraft 11: A remote control aircraft offering ground vehicle-like control, the aircraft comprising a flight control microprocessor configured to:
perform a steering control process, the steering control process comprising:
receiving a steering instruction specified by a pilot, the steering instruction comprising a steering angle; and
determining a steering aircraft action to respond to the steering angle; and
operate the aircraft in accordance with the steering aircraft action.

Aircraft 12: Aircraft 11, wherein the steering aircraft action comprises setting a roll rate and setting a yaw rate.

Aircraft 13: Aircraft 11, wherein the aircraft is a fixed-wing aircraft.

Aircraft 14: Aircraft 11, wherein the aircraft is a helicopter.

Aircraft 15: Aircraft 11, wherein the aircraft is a multi-rotor helicopter comprising four rotors and four motors, with each rotor controlled by a motor.

Controller 1: A transmit controller offering ground vehicle-like control for a remote control aircraft, the transmit controller comprising:
a steering control;
a throttle/brake control; and
an altitude control.

Controller 2: Controller 1, wherein the steering control comprises a steering knob.

Controller 3: Controller 1, wherein the throttle/brake control comprises a throttle trigger.

Controller 4: Controller 1, wherein the altitude control comprises a gimbal.

Controller 5: Controller 1, wherein the altitude control comprises a tilt sensor.

Controller 6: A transmit controller offering ground vehicle-like control for a remote control aircraft, the transmit controller comprising:
a steering control; and
a throttle/brake control.

Controller 7: Controller 6, wherein the steering control comprises a steering knob.

Controller 8: Controller 6, wherein the throttle/brake control comprises a throttle trigger.

Emulation Mode

The foregoing may describe a method for controlling a remote control aircraft offering ground vehicle-like control in what may be described as an "emulation mode." In the emulation mode, the remote control aircraft may behave like a ground vehicle, thereby offering ground vehicle-like control to the user. The remote control aircraft may transition out of emulation mode as required to perform other special maneuvers, and may transition back into emulation mode to resume offering ground vehicle-like control to the user. In an embodiment, ground-like vehicle control may be achieved in emulation mode by mapping the articulation of the aircraft to a model of a ground vehicle. The articulation of each type of aircraft may be particular to itself and its performance characteristics. For example, a fixed-wing aircraft may have different performance characteristics than a helicopter in that a fixed wing aircraft cannot hover or fly in reverse. In emulation mode, the flight control process may perform an aerial maneuver by continuously controlling pitch angle, pitch rate, yaw rate, bank angle, and the like to map the desired phase point derived from the model of the ground vehicle, used as the control model, to a phase point the aircraft can reach. As is well-known, a phase point is a point in a multidimensional space in which each axis corresponds to one of the coordinates required to specify the state of a physical system, all the coordinates being thus represented so that a point in the space corresponds to a state of the system. In the emulation mode, all of the performance capabilities of the aircraft may be utilized to achieve realistic ground-like control of the aircraft in one or more aerial maneuvers, which may be controlled automatically by the flight control process to achieve the operations command by control inputs from the transmitter controller. In an embodiment, certain special features or operations may be provided by execution of the flight control process.

Figure 17:
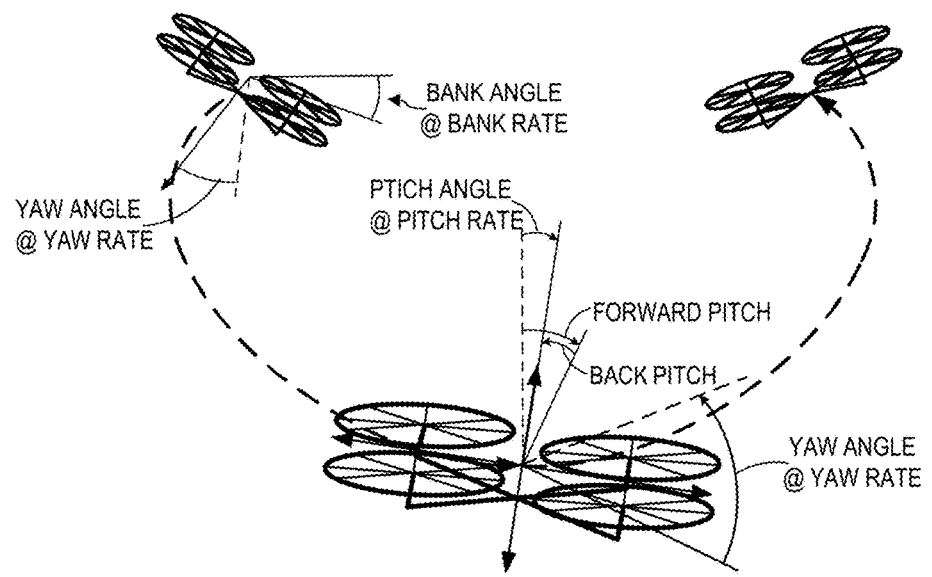
FIG. 17 is a pictorial diagram illustrating an aircraft making a turn.

During emulation mode, the mode of emulating the behavior of a ground vehicle, the pilot may only be concerned with steering the aircraft while other functions such as control of bank angle bank rate, yaw rate, yaw angle pitch angle and pitch rate are executed automatically. During emulation mode, the aircraft may pitch forward while under forward motion. In an emulation-mode turn, as shown in FIG. 17, the aircraft may yaw in the desired direction of the turn at a desired yaw rate and roll rate, and automatically introduce an appropriate amount of roll, or bank angle, bank rate, and pitch rate to match the phase point in the ground vehicle model.

Terrain/Topography

The flight control process for the aircraft may be programmed to follow ground terrain and thereby execute an aerial maneuver that produces a terrain-following effect. The terrain-following effect may be more pronounced at lower altitudes, and may be smoother or less pronounced at higher altitudes. In an embodiment as shown for example in FIG. 18, the aircraft 600 may maintain a fixed height H above the ground 1. When an "obstacle" 1700 is encountered and detected, the aircraft may react by increasing altitude as illustrated by flight path 1702. Examples of such an obstacle 1700 may include a large rock, a full sized car, a hill, a mound, a log, and the like. The obstacle 1700 may be detected by one or more sensing means such as ultrasonic, laser TOF (time of flight), lidar, stereoscopic vision, and the like. The flight path 1702 may be characterized by an increase in height above the ground 1 while the aircraft 600 is over the obstacle 1700.

Turning now to FIG. 19, the flight control process for the aircraft 600 may incorporate a method 1800 for implementing a terrain-following mode in which the aircraft 600 may maintain a fixed height H above the ground 1. In step 1802 the aircraft 600 may scan the ground 1 for an obstacle 1700. In step 1804 it is determined whether a new obstacle has been detected. If a new obstacle has been detected, in step 1806 the aircraft 600 may increase altitude to avoid the obstacle 1700. The method 1800 may return to step 1802 to scan for an obstacle. If in step 1804 it is determined that no new obstacle is detected, in step 1808 it is determined whether the former obstacle 1700 is now gone, behind the aircraft 600. If the former obstacle 1700 has been passed and is now gone, in step 1810 the aircraft may reduce altitude to resume fixed height H above the ground 1. If the former obstacle 1700 has not been passed and is present, in step 1812 the aircraft 600 may maintain increased altitude. The method 1800 may return to step 1802 to scan for an obstacle.

Virtual Jumps

Figure 20:
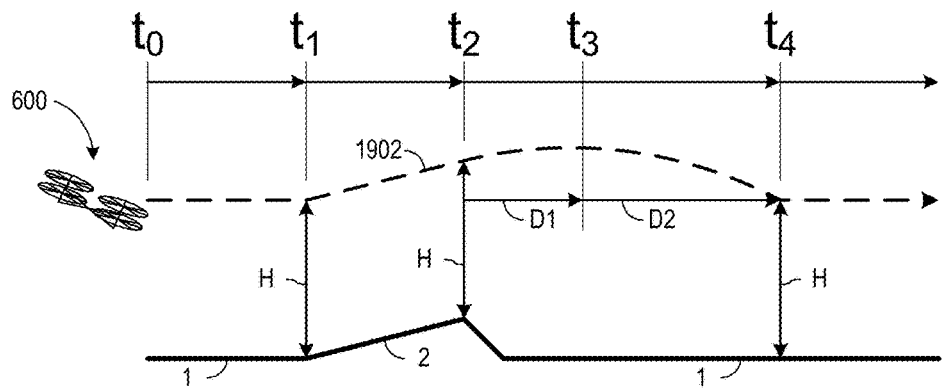
FIG. 20 is a pictorial diagram illustrating an aircraft making a jump.

Similar to terrain/topography, the flight control process for the aircraft may be programmed or configured to execute virtual jumps, which is to go over, or hit, jumps, and execute an aerial maneuver that imparts a trajectory into the flight path of the aircraft. A "jump" may be a ramp of some particular distance and angle to the ground, and may be designed to launch a ground vehicle travelling at a certain speed into the air for a certain distance thereby imparting a trajectory into the path of the ground vehicle. Referring to FIG. 20, a jump 2 is depicted on otherwise level ground 1. An aircraft 600 may be travelling a certain height H above the ground 1 at a time $t_0$. At a time $t_1$, the aircraft 600 may encounter or "hit" the jump 2. In response to hitting the jump 2, the aircraft 600 may increase altitude and the flight control process may impart a trajectory into the flight path of the aircraft 600, very similar to the response of a ground vehicle after hitting a real jump. The flight control process may increase the altitude of aircraft 600 between time $t_1$ when the aircraft 600 hits the jump 2 and time $t_2$, when the aircraft 600 passes the high point of the jump 2. The flight control process may continue to increase the altitude of aircraft 600 at a decreasing rate and at time $t_3$, after travelling a first distance D1, the flight control process may begin to decrease the altitude of aircraft 600 over a second distance D2, mimicking the behavior and trajectory of a ground vehicle hitting a jump. The aircraft 600 may also be configured to perform various stunts or tricks after hitting the jump, such as a back-flip, front-flip, roll, and the like. At time $t_4$, the aircraft 600 may have completed its trajectory and may resume level, upright flight and a fixed height H above the ground 1. In an embodiment, a terrain-following system such as a flight control system programmed to follow ground terrain and maintain a fixed height above the ground, may include virtual jump programming to impart trajectory into the avoidance of certain obstacles such as obstacles above a certain size. In an embodiment, the threshold size may be user-adjustable or part of a vehicle profile. In an embodiment, the virtual jump programming may produce a more pronounced jump at lower altitudes, and may be smoother or produce a less pronounced jump at higher altitudes.

Traction and Skidding; Road Conditions; Ice, Snow, Concrete, Dirt, Etc.

Figure 21:
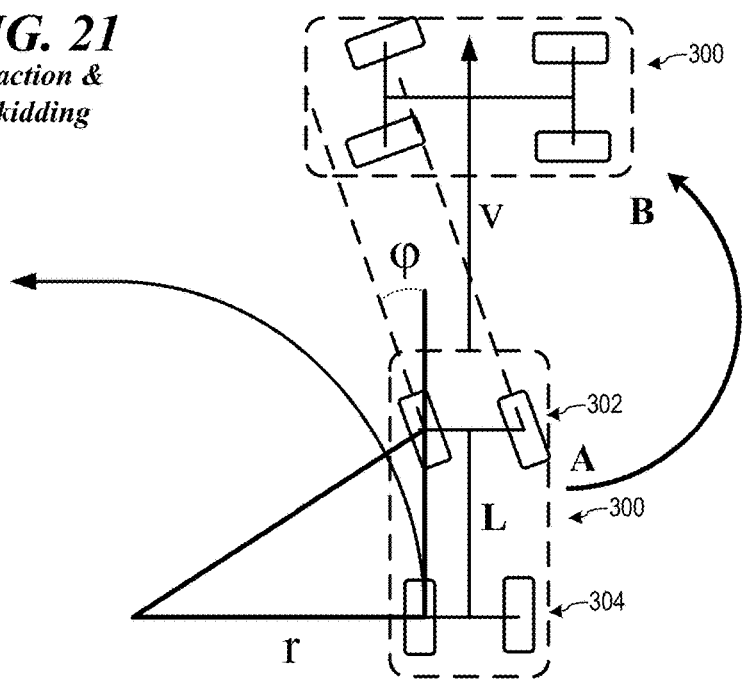
FIG. 21 is a pictorial diagram illustrating a ground-vehicle model performing a maneuver exhibiting loss of traction.
Figure 22:
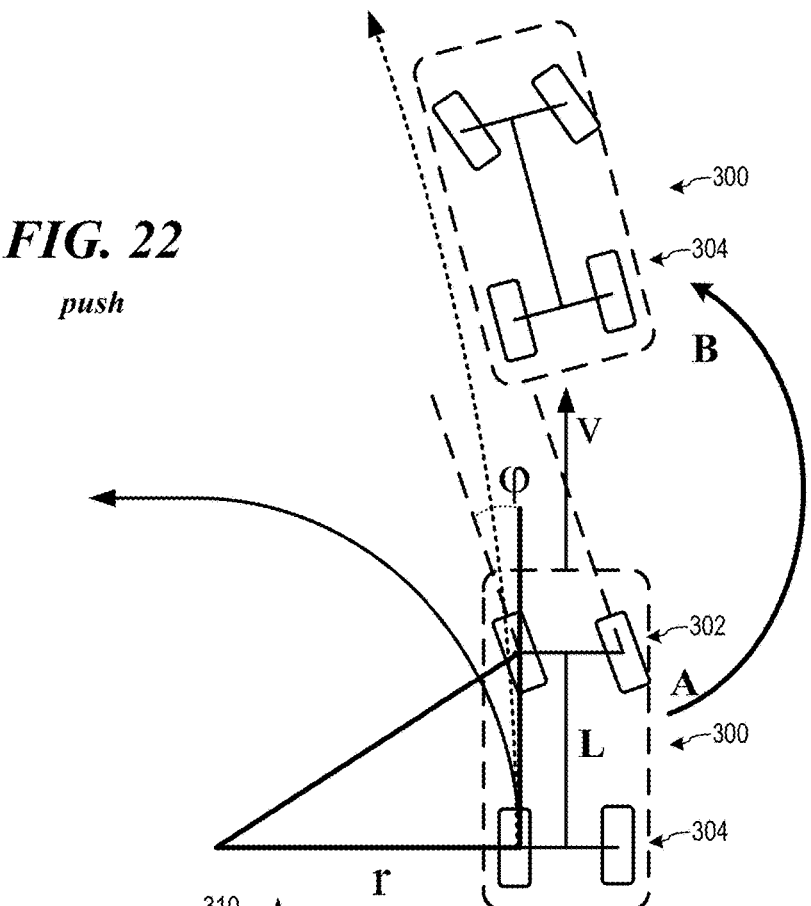
FIG. 22 is a pictorial diagram illustrating a ground-vehicle model performing a maneuver exhibiting loss of traction.

Turning now to FIG. 21, the aircraft 600 may be programmed to execute an aerial maneuver that mimics the behavior of a ground vehicle 300 under certain different road conditions, such as ice, snow, concrete, dirt, and the like. The flight control system of aircraft 600 may be programmed to mimic a dynamic model of a ground vehicle that simulates the dynamic behavior of the ground vehicle being driven on ice, snow, concrete, dirt and the like. Using the dynamic model of the ground vehicle, flight control system of aircraft 600 may mimic the response rate, understeer/oversteer behavior, traction threshold, and the like. A shown in FIG. 21, a ground vehicle travelling at speed V and at position A may be commanded to steering angle φ to achieve turning radius r. Under certain road conditions, there may be insufficient traction to enable vehicle 300 to execute the commanded turn above a threshold speed V. Under such conditions, the aircraft 600 may respond by yawing to position approximating a desired heading, however the aircraft may continue in a forwardly direction and may come to a stop at position B, thereby mimicking the behavior of a ground vehicle that exhibits oversteer behavior, and "spinning out" for example. Other such behaviors may result from simulating the dynamic behavior of the ground vehicle being driven on ice, snow, concrete, dirt and the like. As shown in FIG. 22, a ground vehicle that exhibits understeer behavior may "push" the turn and make a larger turning radius than commanded. Under certain conditions, a ground vehicle may be commanded to a certain steering angle, but the speed of the vehicle combined with the dynamic behavior of the ground vehicle may result in only a slight rotation, or yaw, of the ground vehicle. The drive wheels 304 may continue to drive the ground vehicle 300 in the direction it is heading, which makes for a much larger turning radius than commanded.

Oversteer and Understeer Tuning

Figure 23:
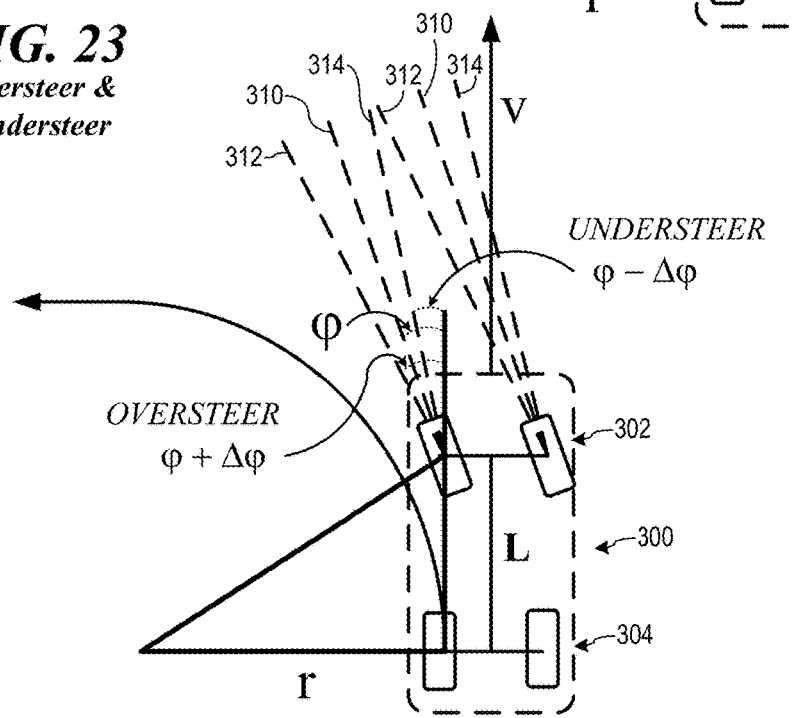
FIG. 23 is pictorial diagram illustrating a ground-vehicle model performing a maneuver exhibiting oversteer or understeer.

Turning now to FIG. 23, in some embodiments the aircraft may execute an aerial maneuver that emulate neutral steering in a ground vehicle 300, wherein the turning radius r may be constant given a fixed steering input at the transmit controller. FIG. 23 illustrates neutral steering as steering direction 310. To emulate a ground vehicle that exhibits oversteer, a simple oversteer model may be used where the turning radius may decrease as the speed of the aircraft increases. To emulate a ground vehicle that exhibits understeer, a simple understeer model may be used where the turning radius may increase as the speed of the aircraft increases. Dynamic models of ground vehicles are well-known, and described for example in "Race Car Vehicle Dynamics" by Milliken and Milliken, and in "Fundamentals of Vehicle Dynamics" by Gillespie. A shown in FIG. 23, a ground vehicle 300 may be commanded to a steering angle φ. In an oversteer mode, the flight control system of an aircraft emulating oversteering in a ground vehicle may increase the steering angle φ in dependence upon the speed V of the aircraft and of the emulated ground vehicle to steering direction 312, for example. In an understeer mode, the flight control system of an aircraft emulating understeering in a ground vehicle may decrease the steering angle φ in dependence upon the speed V of the aircraft and of the emulated ground vehicle to steering direction 314, for example. In an embodiment, the flight control system may calculate a Δφ in dependence upon speed V, and the Δφ may be added to steering angle φ to emulate oversteer in a ground vehicle. In an understeer mode, the flight control system of an aircraft emulating understeering in a ground vehicle may decrease the steering angle φ in dependence upon the speed V of the aircraft and of the emulated ground vehicle. The flight control system may calculate a Δφ in dependence upon speed V, and the Δφ may be subtracted from steering angle φ to emulate understeer in a ground vehicle. More complex oversteer/understeer models may also be used to more accurately emulate the dynamics of a ground vehicle. Such models are well known by those skilled in the art.

Fixed Wheelbase

Figure 24:
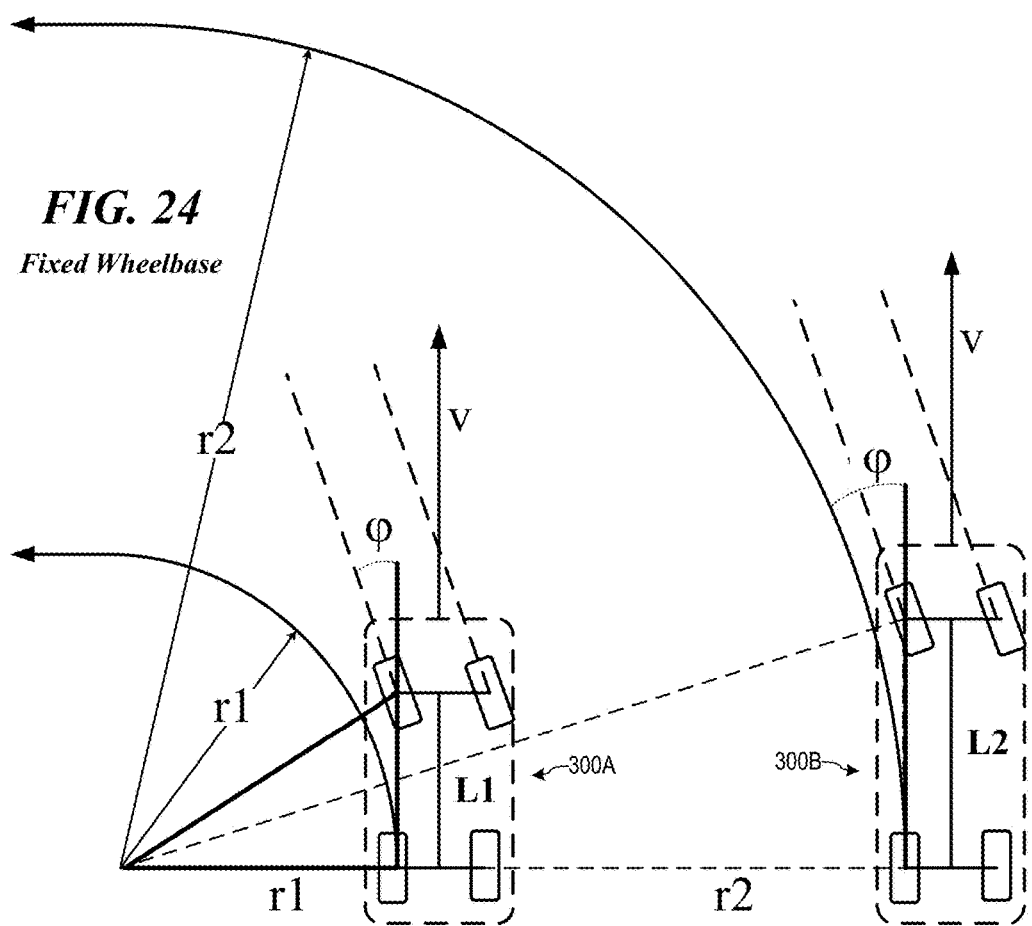
FIG. 24 is a pictorial diagram illustrating ground-vehicle modes performing a maneuver under different wheelbase conditions.

In some embodiments the aircraft may execute an aerial maneuver that emulates the functionality of a ground vehicle having a fixed wheelbase of a certain length. In some embodiments, the wheelbase may be selectable from among a range of "short," "medium," "long," and the like, wherein the designations short, medium, long, and the like may each be defined by wheelbase of a different distance. This wheelbase may be used to alter the performance of the aircraft emulating a ground vehicle based upon the relative length of the wheelbase of the ground vehicle being emulated. For example, and as illustrated in FIG. 24, for a given steering angle φ, the radius r of the turn may be proportional to wheelbase length L. Ground vehicle 300A is shown having a first wheelbase of length L1, a commanded steering angle φ, and a forward speed V. The resulting turn radius is shown as r1 in FIG. 24. Ground vehicle 330B is shown having a second wheelbase of length L2, wherein length L2 is greater than length L1. Ground vehicle 300B having a long wheelbase is also shown as having a steering angle φ, and a forward speed V. In the example shown, steering angle φ, and a forward speed V may be the same for ground vehicle 300A and ground vehicle 300B. The longer wheelbase L2 of ground vehicle 300B is shown to have a greater turn radius than short-wheelbase ground vehicle 300A at a given steering angle and forward speed.

Dynamic Response

Figure 25:
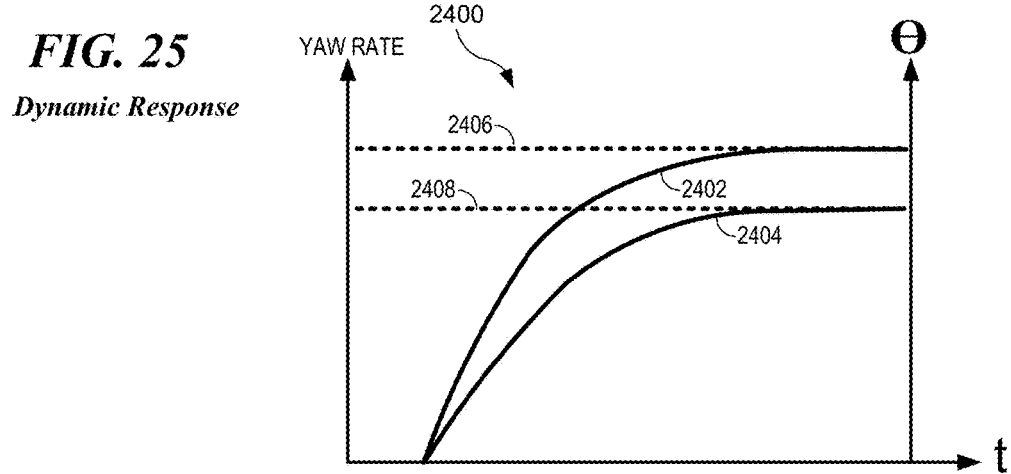
FIG. 25 is a graph representing aircraft steering parameters over time.

In certain embodiments, it may be desirable to change the response rate of the aircraft to a steering input on the transmit controller. This change in the response rate may emulate the response to changing the overall resilience of the vehicle, accounting for spring force in the suspension, the tires, and the like. The change in the response rate may be dynamic. In an embodiment, the aircraft may execute an aerial maneuver in which the response rate of the aircraft to a control input, such as a steering input on the transmit controller may be subject to a "response time contour" parameter, which may be variable. The response time contour may combined with the steering angle command to control the rate at which the aircraft responds to the steering input. As shown in FIG. 25, a response time contour 2402 is potted in a graph 2400 wherein time "t" is plotted along a horizontal axis, and wherein a steering angle θ and a yaw rate are plotted along vertical axes. The response time contour may correspond to a model of a ground vehicle having relatively high stiffness in its resilient suspension components. A response time contour corresponding to a model of a ground vehicle having relatively low stiffness in its resilient suspension components may be represented by response time contour 2404. By comparison, the yaw rate may rise more quickly in response to a steering angle input along response time contour 2402, corresponding to a model of a ground vehicle having relatively high stiffness in its resilient suspension components, and the resultant yaw rate may be greater as shown by yaw rate level 2406. The yaw rate may rise more slowly in response to a steering angle input along response time contour 2404, corresponding to a model of a ground vehicle having relatively low stiffness in its resilient suspension components, and the resultant yaw rate may be lower as shown by yaw rate level 2408. The rate at which the aircraft responds to the steering input may be variable. In an embodiment, the aircraft may be configured to respond to a steering input relatively quickly, with a greater response contour such response contour 2402. For example, a ground vehicle with tires of high sidewall stiffness may react very quickly to a steering input, and this may be accounted for in the model of the ground vehicle. In an embodiment, the aircraft may be configured to respond relatively slowly, with a relatively lower response time contour such as response contour 2404. For example, a ground vehicle with tires of low sidewall stiffness may react very slowly to a steering input, and this may be accounted for in the model of the ground vehicle.

Brake to a Stop

Figure 26:
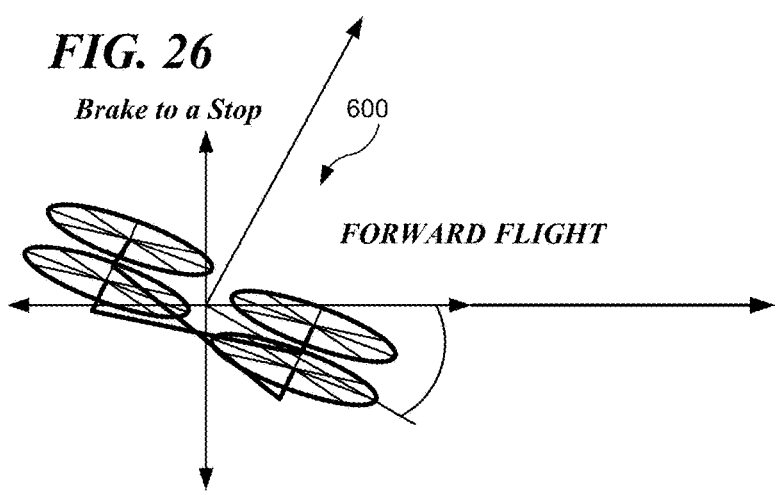
FIG. 26 is a pictorial diagram illustrating an aircraft in forward flight.
Figure 27:
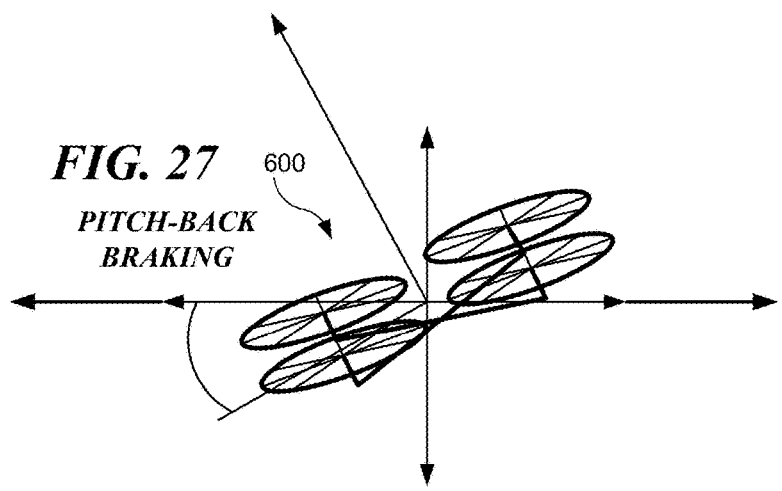
FIG. 27 is a pictorial diagram illustrating an aircraft executing pitch-back braking.
Figure 28:
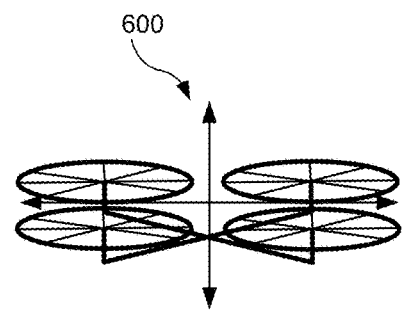
FIG. 28 is a pictorial diagram illustrating an aircraft in a position-hold mode.

In some embodiments the aircraft may execute an aerial maneuver that emulates the functionality of a ground vehicle braking to a stop. In an embodiment, to stop the aircraft 600 in forward flight as shown in FIG. 26, a pilot may apply the brakes by pushing the throttle trigger 102 forward as shown in FIG. 1C. The aircraft 600 may pitch back as shown in FIG. 2 to decrease forward speed. If the throttle trigger is held forward, the aircraft may remain pitched back until forward speed is reduced to zero and the aircraft has stopped, at which point the aircraft may return to a level pitch attitude as shown in FIG. 28, even though the throttle trigger is still being held forward. The aircraft 600 may enter a hover mode in this state, in which the aircraft may remain at its current position subject to drift due to air currents. In an embodiment, the aircraft may be equipped with GPS, optical flow or other sensors to measure ground speed, and may enter a position-hold mode at this point, in which the aircraft may remain at its current position, using its sensors to detect and correct for drift due to air currents.

Coast

Figure 29:
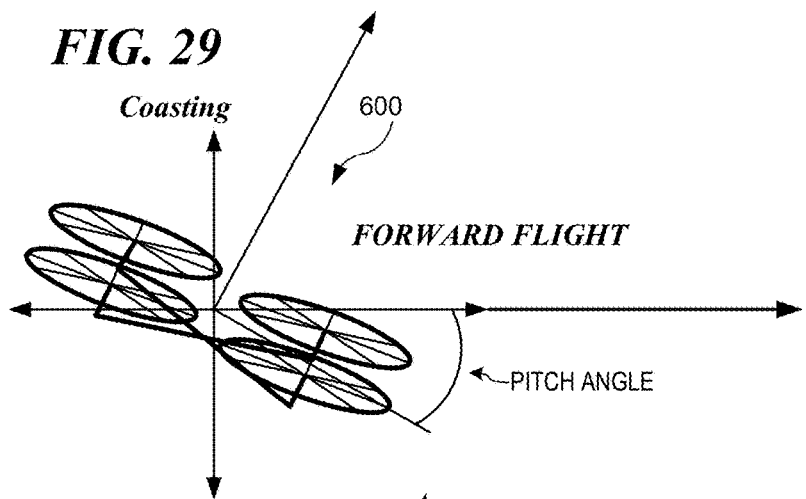
FIG. 29 is a pictorial diagram illustrating an aircraft in forward flight.
Figure 30:
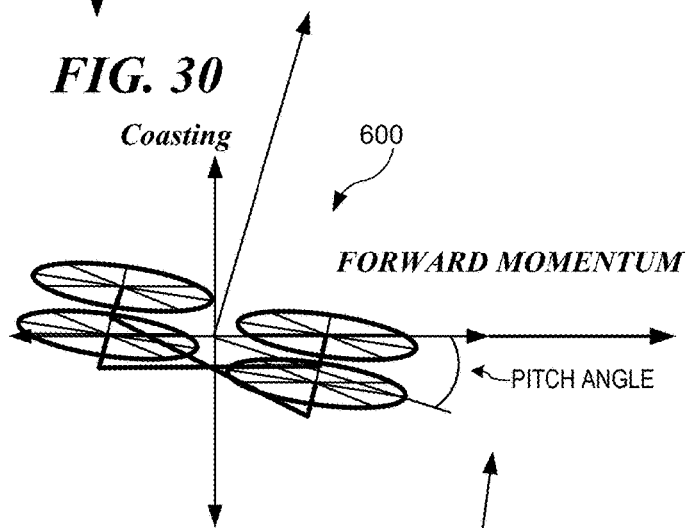
FIG. 30 is a pictorial diagram illustrating an aircraft exhibiting forward momentum.
Figure 31:
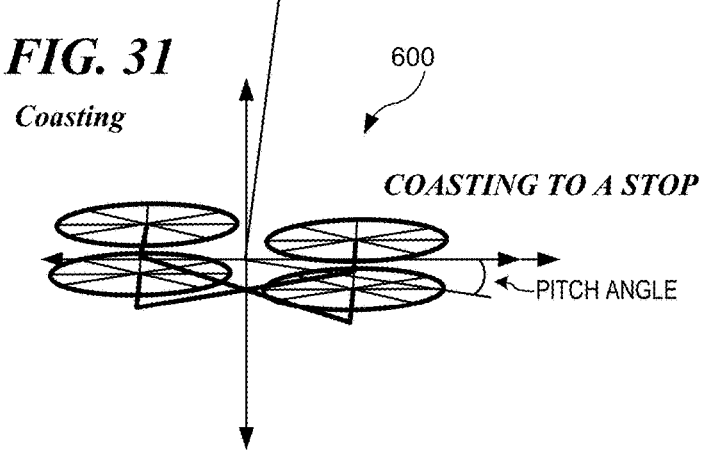
FIG. 31 is a pictorial diagram illustrating an aircraft coasting to a stop.

In some embodiments the aircraft may execute an aerial maneuver that emulates the functionality of a ground vehicle coasting after tractive power has been removed. A ground vehicle may coast indefinitely on level ground if friction is zero. A real ground vehicle will coast to a stop due to friction in the drivetrain, friction between the tires and the ground and friction between the vehicle and the surrounding atmosphere. The aircraft may utilize a simple dynamic "coasting model" to emulate the ground vehicle's behavior. Several different coasting models may be developed to emulate different ground vehicle behavior such as regenerative braking as used on electric and hybrid ground vehicles, exhaust brakes or the like. In an embodiment, the aircraft may use a coasting model when forward speed is non-zero and the forward speed command goes from non-zero to zero, and in the absence of a braking command. Use of the coasting model may be discontinued upon receipt of a braking command or a non-zero forward speed command. As shown in FIG. 29, the aircraft 600 may be pitched forward in forward flight. As shown in FIG. 30, the aircraft 600 may continue with forward momentum and, in some embodiments, the pitch angle may be reduced over time to emulate a gradual reduction in speed due to friction the model of the ground vehicle. As shown in FIG. 31, the aircraft 600 may eventually coast to a stop in some embodiments, in which the pitch angle may be further reduced over time to gradually bring the aircraft 600 to a stop.

Hover Control

As described above, an aircraft 600 may execute an aerial maneuver that enters a position-hold mode when forward speed is reduced to zero and the aircraft has stopped, and the aircraft may have returned to a level pitch attitude and, more particularly, when the braking input is still on such as while throttle trigger 102 is still pushed forward as shown in FIG. 1C. The flight control system of the aircraft 600 may recognize this state as "hovering" or being in a hover mode. In some embodiments the aircraft may respond to certain controls on the transmit controller to adjust the attitude of the aircraft while maintaining its position, or hovering. For example, in an embodiment as shown in FIG. 32, the left-right tilt or roll control 16 on a prior art transmit controller 14 may be used to control the left-to-right bank attitude of the aircraft, which would correspond to the aileron channel for a fixed-wing aircraft. In an embodiment, a rotatable knob such the steering wheel 104 of a ground vehicle controller 100 may be used to control the left-to-right bank attitude of the aircraft.

Turning now to FIG. 33, an aircraft 600 is shown in hover mode, maintaining its position, wherein the aircraft is facing front. In the example shown in FIG. 33, the aircraft 600 may be level, with zero bank attitude and zero pitch attitude. The pilot may operate the left-right tilt or roll control 16 to the right, or may turn the steering wheel 104 to the right, and the aircraft 600 in position-hold mode or hover mode may bank or roll to the right, as shown in FIG. 34. The aircraft 600 may assume a right bank attitude while maintaining its position. The pilot may operate the left-right tilt or roll control 16 to the left, or may turn the steering wheel 104 to the left, and the aircraft 600 in position-hold mode or hover mode may bank or roll to the left, as shown in FIG. 35. The aircraft 600 may assume a left bank attitude while maintaining its position. In left or right bank attitude, the aircraft 600 may be inclined from the horizontal by a tilt angle $\rho$ (rho). The tilt angle $\rho$ may correspond to the extent to which the pilot has operated the corresponding control.

In certain embodiments, the aircraft may transition from "hover mode" in which the aircraft maintains position while still affording the pilot control over the left-to-right bank attitude of the aircraft, once the aircraft's forward speed estimate exceeds a certain threshold. The aircraft may transition from hover mode into "emulation mode," the mode of emulating the behavior of a ground vehicle. In certain embodiments there may be a step-wise transition from hover mode to emulation mode. In other embodiments there may be gradual, linear transition from hover mode to emulation mode, or some other transition as defined by an equation or other function.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

We claim:

1. A method for a remote control aircraft offering ground vehicle-like control, the method comprising:
   receiving an altitude command from a transmitter controller;
   receiving at least one steering angle control input from a transmitter controller;
   an electronic state estimation process, executed by a processor, comprising estimating an attitude, an acceleration, and a velocity of the aircraft;
   an electronic steering control process, executed by a processor, comprising:
   mapping a model of a ground vehicle, the ground vehicle including a wheel base, comprising mapping the at least one steering angle control input to steering of the model of the ground vehicle; and
   utilizing the mapping of the model of the ground vehicle, the aircraft velocity estimate, and the at least one steering angle control input to command at least an aircraft yaw rate, an aircraft bank angle, and an aircraft pitch angle; and
   an electronic flight control process, executed by a processor, comprising controlling the aircraft to the aircraft yaw rate, aircraft bank angle, the aircraft pitch angle and the aircraft pitch rate commanded by the electronic steering control process and maintaining an altitude set by the altitude command.

2. The method of claim 1, wherein the electronic flight control process controls the aircraft to follow the contour of a terrain over which it flies, and maintain a constant altitude above the ground.

3. The method of claim 1, wherein the electronic flight control process of the aircraft increases altitude in response to an obstacle in its path.

4. The method of claim 1, wherein the electronic flight control process controls the aircraft to follow the contour of a terrain over which it flies, and follow a trajectory as the contour of the terrain rises and falls.

5. The method of claim 4, wherein the electronic flight control process controls the aircraft to perform tricks while following said trajectory, the tricks comprising flips, rolls, spins and combinations thereof.

6. The method of claim 1, wherein the method further comprises the electronic flight control process:
   estimating aberrant conditions; and
   adjusting the state of the model of the ground vehicle to account for the aberrant conditions;
   wherein the aircraft mimics the behavior of the ground vehicle under the aberrant conditions.

7. The method of claim 6, wherein the aberrant conditions may comprise one or more of the following: oversteer/understeer behavior; road traction corresponding to road conditions; and inertial delay effects.

8. The method of claim 1, further comprising the steps of:
   receiving a braking command from the transmitter controller;
   the electronic flight control process controlling the aircraft to reduce speed to zero;
   wherein the electronic flight control process maintains zero speed until a forward speed command is received.

9. The method of claim 1, further comprising the steps of;
   receiving a speed command that goes from non-zero speed to zero speed;
   in the absence of a braking command, the electronic flight control process maintaining forward motion while gradually and continuously reducing speed.

10. The method of claim 1, further comprising the step of:
    the electronic steering control process controlling pitch angle and pitch rate in response to the at least one steering angle control input.

11. The method of claim 1, wherein the electronic flight control process further comprises:
  entering a hover mode while forward speed is zero, wherein the at least one steering angle control input controls the aircraft bank angle; and
  exiting the hover mode upon receipt of a non-zero forward speed command.

* * * * *